(12) United States Patent
Mullin

(10) Patent No.: US 9,967,365 B2
(45) Date of Patent: May 8, 2018

(54) INFORMATION MANAGEMENT SOFTWARE AND METHOD

(75) Inventor: Terence J. Mullin, Orange, CA (US)

(73) Assignee: VIRIDISTOR, LLC, Tustin, CA (US)

( * ) Notice: Subject to any disclaimer, the term of this patent is extended or adjusted under 35 U.S.C. 154(b) by 901 days.

(21) Appl. No.: 13/536,895

(22) Filed: Jun. 28, 2012

(65) Prior Publication Data

US 2014/0006547 A1   Jan. 2, 2014

Related U.S. Application Data

(60) Provisional application No. 61/502,262, filed on Jun. 28, 2011.

(51) Int. Cl.
| | | |
|---|---|---|
| *G06F 15/173* | (2006.01) | |
| *H04L 29/08* | (2006.01) | |
| *G06Q 10/02* | (2012.01) | |
| *G06Q 30/02* | (2012.01) | |
| *G06F 3/06* | (2006.01) | |

(52) U.S. Cl.
CPC ............ *H04L 67/32* (2013.01); *G06Q 10/02* (2013.01); *G06Q 30/02* (2013.01); *G06F 3/0679* (2013.01)

(58) Field of Classification Search
CPC ............. G06F 3/00; H04L 29/08; H04N 7/18
See application file for complete search history.

(56) References Cited

U.S. PATENT DOCUMENTS

| | | |
|---|---|---|
| 5,822,500 A | 10/1998 | Utsunomiya et al. |
| 5,835,911 A | 11/1998 | Nakagawa et al. |
| 5,936,542 A | 8/1999 | Kleinrock et al. |
| 6,405,278 B1 | 6/2002 | Liepe |
| 6,563,494 B1 | 5/2003 | Eichstaedt et al. |
| 6,704,733 B2 | 3/2004 | Clark et al. |
| 6,879,810 B2 | 4/2005 | Bouet |
| 7,103,592 B2 | 9/2006 | Huret |

(Continued)

FOREIGN PATENT DOCUMENTS

| | | |
|---|---|---|
| JP | 2003-167976 A | 6/2003 |
| JP | 2005-173780 A | 6/2005 |

(Continued)

OTHER PUBLICATIONS

International Preliminary Report on Patentability on related PCT Application No. PCT/US2012/044732 from International Searching Authority (KIPO) dated Jan. 7, 2014.

(Continued)

*Primary Examiner* — Aftab N. Khan
(74) *Attorney, Agent, or Firm* — Klein, O'Neill & Singh, LLP

(57) ABSTRACT

A method is disclosed in which exhibitors or information management softwares at an event provide digital content to a content administrator, who in turn processes the digital content and loads it onto a content delivery device. At the event attendees are issued portable memory devices that, when engaged with a content delivery device, upload the digital content from that content delivery device. Each portable memory device has an information management software that enables the attendee to search, correlate and manage the digital content. In some embodiments digital content is loaded to the portable memory device without use of the content delivery device.

15 Claims, 17 Drawing Sheets

(56) References Cited

U.S. PATENT DOCUMENTS

| | | |
|---|---|---|
| 7,212,983 B2 | 5/2007 | Redmann et al. |
| 7,257,581 B1 | 8/2007 | Steele et al. |
| 7,333,977 B2 | 2/2008 | Swaminathan et al. |
| 7,668,885 B2 | 2/2010 | Wittke et al. |
| 7,774,384 B2 | 8/2010 | Kortum et al. |
| 7,822,866 B2 | 10/2010 | Doumuki |
| 7,827,175 B2 | 11/2010 | Plow et al. |
| 7,979,430 B2 | 7/2011 | Mullin |
| 8,185,351 B2 | 5/2012 | Crystal et al. |
| 8,332,281 B2 | 12/2012 | Smith et al. |
| 8,527,320 B2 | 9/2013 | Neuhauser et al. |
| 2002/0059363 A1 | 5/2002 | Katz et al. |
| 2002/0068991 A1 | 6/2002 | Fitzsimmons, Jr. |
| 2002/0087891 A1 | 7/2002 | Little et al. |
| 2002/0107027 A1 | 8/2002 | O'Neil |
| 2002/0165630 A1 | 11/2002 | Arthur et al. |
| 2003/0027634 A1 | 2/2003 | Matthews, III |
| 2003/0041206 A1 | 2/2003 | Dickie |
| 2003/0056131 A1 | 3/2003 | Eberhard et al. |
| 2003/0105718 A1 | 6/2003 | Hurtado et al. |
| 2003/0163622 A1 | 8/2003 | Moran |
| 2003/0195833 A1 | 10/2003 | Baranowski |
| 2004/0199631 A1 | 10/2004 | Natsume et al. |
| 2004/0224703 A1 | 11/2004 | Takaki et al. |
| 2005/0197859 A1 | 9/2005 | Wilson |
| 2005/0246494 A1 | 11/2005 | Leon et al. |
| 2006/0078859 A1 | 4/2006 | Mullin |
| 2006/0173752 A1 | 8/2006 | Bowlus et al. |
| 2006/0294235 A1 | 12/2006 | Joseph |
| 2007/0018952 A1* | 1/2007 | Arseneau et al. ............ 345/156 |
| 2007/0106754 A1 | 5/2007 | Moore |
| 2007/0124511 A1* | 5/2007 | Mullin .................. G06F 3/0605 710/8 |
| 2008/0141381 A1 | 6/2008 | Walkoe et al. |
| 2008/0148056 A1 | 6/2008 | Ginter et al. |
| 2008/0208852 A1* | 8/2008 | Kuttikkad ............. G06Q 30/02 |
| 2008/0209079 A1 | 8/2008 | Caswell |
| 2008/0309499 A1* | 12/2008 | Craine ................... G06Q 10/02 340/573.1 |
| 2008/0312946 A1* | 12/2008 | Valentine et al. ................. 705/1 |
| 2009/0009600 A1* | 1/2009 | Butler ............... H04N 7/17318 348/143 |
| 2009/0088088 A1 | 4/2009 | Caswell |
| 2010/0082741 A1* | 4/2010 | Kawada ....................... 709/203 |
| 2010/0088772 A1 | 4/2010 | Mullin |
| 2010/0153286 A1* | 6/2010 | Caswell ............ G06F 17/30017 705/319 |
| 2011/0059772 A1 | 3/2011 | Want et al. |
| 2011/0078035 A1 | 3/2011 | Barton |
| 2011/0270801 A1 | 11/2011 | Mullin |
| 2011/0307506 A1 | 12/2011 | Kass et al. |

FOREIGN PATENT DOCUMENTS

| | | |
|---|---|---|
| JP | 2010-191990 A | 9/2010 |
| KR | 10-2008-0101878 A | 11/2008 |

OTHER PUBLICATIONS

Written Opinion on related PCT Application No. PCT/US2012/044732 from International Searching Authority (KIPO) dated Jan. 8, 2014.

* cited by examiner

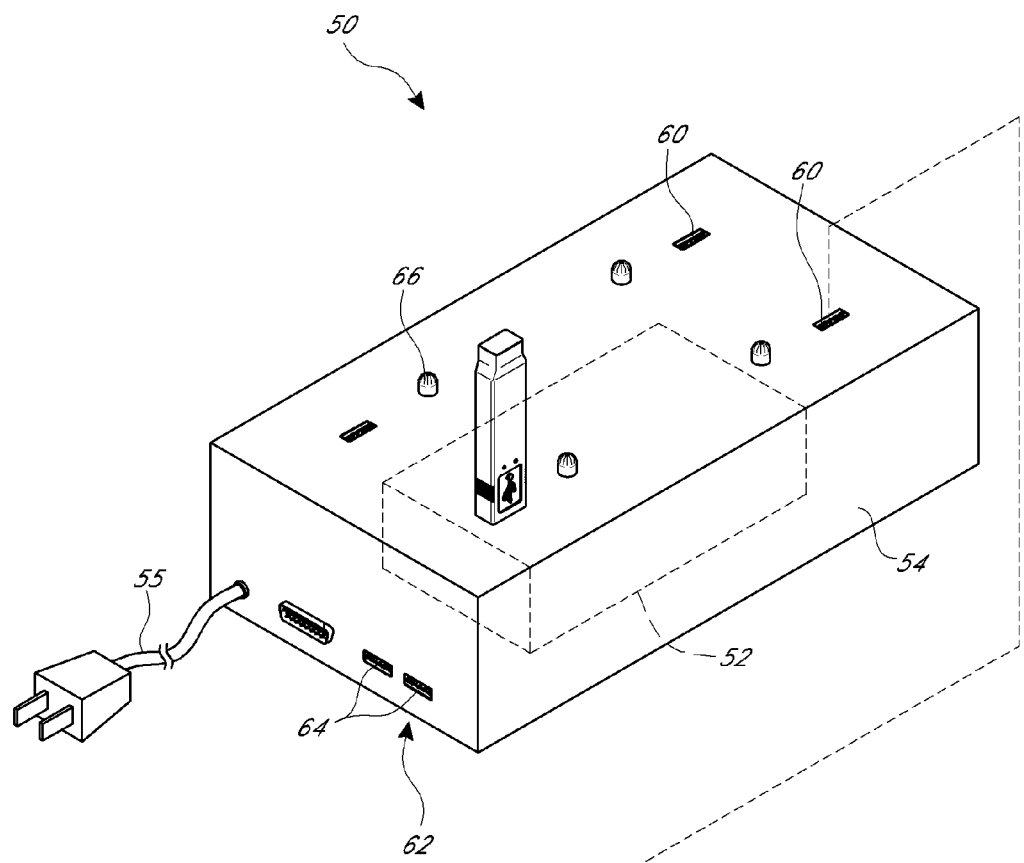
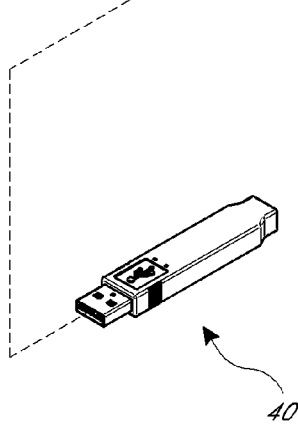
FIG. 1

Modify Categories

Modify Categories

User defined categories makes finiding exhibitor content from within the Viridistor Presenter easy. On this screen you can define new categories or remove existing categories that can later be associated with specific green box content.

Create Category

User defined Categories

Call back in 30 days

Remove

Save  Cancel

*FIG. 9*

*Viridistor*

| Exhibitor | Green Box | Booth Location | Rating |
|---|---|---|---|
| A1 Marine | Product Information | -1815 | 5 |
| A2 Supply Co. | GB01 | -1841 | 3 |
| A3 Yacht Coatings | Sails | -2344 | 3 |
| A4 Corp. | Hull Treatments | -1453 | 3 |
| A5 Inc. | Company Info | -1514 | 3 |
| A6 Formulated Polymers Inc. | Our Specialty | -1621 | 3 |
| A7 GRIP North | Tools & Plans | -1809 | 5 |
| B1 Composites | Materials | -1814 | 4 |
| B2 Plastics Inc. | Product Summary | -2550 | 4 |
| B3 Technologies | Consulting Services | -1847 | 2 |
| B4 Marine Paint | Why to Choose Us | -2623 | 0 |
| B5 Brass Works Inc. | Market | -1209 | 0 |
| B6 Export Inc. | Our History | -2415 | 0 |
| C1 Corp. | C1 and You | -227 | 0 |
| C2 Adhesives Inc. | Stick it! | -1744 | 0 |

| Exhibitor | Rating | Green Box | Booth Location | Initials | Categories |
|---|---|---|---|---|---|
| A1 Marine | ☆☆☆☆☆ | ○ Product Information | -1815 | TJM | ○ ✏ |
| AA1 Marine LLC | ○○○○○ | ○ GB01 | -921 | TJM | ✏ |
| AA2 Marine Group | ○○○○○ | ○ GB01 | -1950 | TJM | ✏ |
| ○ AA3 Electronics Inc. | ○○○○○ | AA3 Electronics Inc. Description | -736 | TJM | ✏ |
| ○ AA4 Corp. | ○○○○○ | AA4 Corp. Description | -301 | TJM | ✏ |
| ○ AA5 Systems Inc. | ○○○○○ | GB01 | -1425 | TJM | ✏ |
| AA6 Marine LLC | ○○○○○ | ○ GB01 | -1843 | TJM | ✏ |
| ○ A2 Supply Co. | ☆☆☆○○ | GB01 | -1138;1140 | TJM | ✏ |
| ○ A3 Yacht Coatings | ☆☆☆○○ | GB01 | -2344 | TJM | ✏ |
| AA8 Marine | ○○○○○ | ○ GB01 | -2607 | TJM | ✏ |
| AA9 Signal Corporation | | GB01 | -2526 | TJM | ✏ |

FIG. 16

Presenter

| Media | Rating | | | | | Initials | Categories |
|---|---|---|---|---|---|---|---|
| | | | | | Sort | Change Initials | |
| SOC | ○ | ○ | ○ | ○ | ○ | M/O | ✎ |
| SOC | ○ | ○ | ○ | ○ | ○ | M/O | ✎ |
| SOC | ○ | ○ | ○ | ○ | ○ | M/O | ✎ |
| ✉ | | | | | | M/O | ✎ |
| SOC | ○ | ○ | ○ | ○ | ○ | M/O | ✎ |

INFORMATION MANAGEMENT SOFTWARE AND METHOD

CROSS-REFERENCE TO RELATED APPLICATIONS

This application claims priority to U.S. Application No. 61/502,262, filed Jun. 28, 2011, also entitled "Information Management Software and Method", the entirety of which is hereby incorporated by reference. This application presents some embodiments that may relate to subject matter discussed in Applicant's previously filed U.S. application Ser. No. 12/576,205, filed Oct. 8, 2009, and Ser. No. 11/525,779, filed Sep. 22, 2006, now U.S. Pat. No. 7,979,430. The entirety of the disclosure of each of these related applications is also hereby incorporated by reference.

BACKGROUND OF THE INVENTION

Field

The present invention is in the field of digital content delivery.

Description of the Related Art

Exhibitions, such as trade shows, are held regularly in many industries in order to provide exhibitors an opportunity to demonstrate their wares to potential purchasers. Exhibitors typically occupy a demonstration booth or the like from which they may present their products and/or services. Traditionally, exhibitors offer printed product literature and/or software-based materials such as CDs and DVDs having product information for interested parties to take in order to learn more about the exhibitor's products or services. Such product literature and materials tends to be expensive both to produce and to transport to and from the exhibition.

Exhibition attendees also face challenges with traditional literature collection. For example, an exhibition attendee who is interested in many different products can quickly accumulate several pounds of paper literature, software-based materials, and other media, which the attendee must lug around the exhibition and eventually transport home. Further, such accumulation of paper literature and other media tends to get jumbled up and disorganized. Thus, the attendee likely loses track of certain literature that was obtained during the exhibition. Further paper-based materials are not easily searched, and are not readily shared with colleagues absent manual photocopying and distribution. On the other hand, software-based DVDs and CDs are not readily organized.

Similar concerns also arise in other contexts, whether it be distribution of materials in a formal or informal educational context, seminars, conferences, marketing or the like. Also, management of commercial literature, such as brochures and the like, requires attention and effort to ensure appropriate literature is kept up-to-date and available at appropriate locations.

SUMMARY

Accordingly, there is a need in the art for a method for efficiently distributing digital content and managing and organizing such content to maximize its usefulness.

The present application teaches a method for developing sales leads in which digital content and information management software for accessing and reviewing the digital content on a computer are provided to a plurality of users, the information management software creating a log of the user access to particular content, and communicating the log to a remote computer.

In some embodiments user access is classified by category, and in further embodiments sales leads are provided to vendors offering products or services within the category accessed by the user.

In other embodiments the user's continued use of the information management software is conditioned upon permission to log and share data about the user's access of content.

The present application discloses an information management software that enables management of digital content from disparate sources obtained from trade shows, exhibitions, retail interaction, marketing, and the like. The present application also discusses methods for delivering digital content along with information management software that enables one to use that content without searching for other applications.

BRIEF DESCRIPTION OF THE DRAWINGS

FIG. 1 is a schematic illustration of a system and method in accordance with one embodiment.

FIG. 5 shows a screen shot from a user computer showing category searching in accordance with one embodiment.

FIG. 6 shows a screen shot from a user computer showing aspects of data managed in accordance with an embodiment.

FIG. 9 shows a screen shot from a user computer showing creation of user defined categories in accordance with an embodiment.

FIG. 11 shows a screen shot from a user smart phone showing data exported from information management software.

FIG. 14 shows a screen shot from a user computer showing search results configured in accordance with an embodiment.

FIG. 16 shows a screen shot from a user computer showing linking to social networking of entities from which digital content was obtain in accordance with an embodiment.

DETAILED DESCRIPTION

Figure 2:
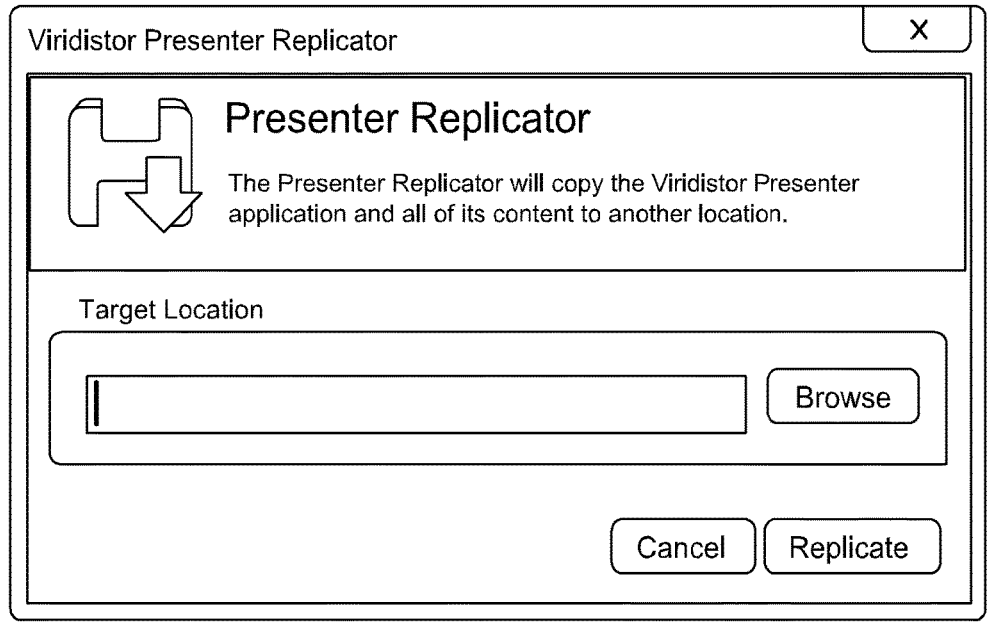
FIG. 2 shows a screen shot from a user computer when copying digital content.

With initial reference to FIG. 1, an embodiment of a system and method for delivering digital content is presented. In order to aid presentation, illustrated embodiments will be discussed, for the most part, in the context of an event such as a trade show. In a preferred embodiment a digital content administrator provides certain hardware and software to facilitate communication of digital content. In the illustrated embodiment the administrator gives an attendee, or user, a portable electronic memory storage device 40 for uploading electronic information from exhibitors, such as vendors.

In one embodiment, the portable electronic memory storage device 40 comprises a USB-based memory device such as a "flash memory" drive or "thumb drive." Of course, it is to be understood that other types of portable electronic memory devices can be employed. For example, acceptable portable memory devices may include, without limitation, small card-based memory such as "compact flash" memory cards or "memory sticks," hand-held computers, such as personal digital assistants (PDAs), laptop and/or tablet computers, smartphones and other portable electronic devices that have an electronic memory that can store digital files in data, audio, video, or other formats.

In the context of a trade show, exhibitors generally have demonstration booths, kiosks, or the like at which they present information about their products. In the embodiment illustrated in FIG. 1, the administrator issues an exhibitor a content delivery device 50 that may be placed at or adjacent the exhibitor's booth. The content delivery device 50 preferably comprises a preprogrammed computing portion 52 which includes hardware such as a processor, a memory device such as a disk drive, solid state RAM, or the like, and includes software and/or firmware for running such hardware. A power cord 55 provides power for the device 50.

Preferably, the computing portion 52 of the content delivery device 50 is enclosed within a protective housing 54. The content delivery device 50 preferably also includes one or more interfaces 60, such as USB ports, that are in electronic communication with the computing portion 52. The interfaces 60 preferably are readily accessible, such as shown in FIG. 1, which depicts the interfaces 60 on a top of the housing 54. The illustrated content delivery device includes four interfaces 60, each of which is electronically linked to the computing portion 52. The illustrated device also has a connector section 62, which has one or more input connectors 64 for interfacing with an administrator computer. Preferably the connector section 62 is spaced from the interfaces 60 to avoid any confusion.

In the illustrated embodiment, the content delivery device 50 is loaded with digital content that the exhibitor would like to share with trade show attendees. In some embodiments the exhibitor loads its digital content directly onto the content delivery device. In other embodiments the exhibitor submits the digital content to the administrator. The administrator in turn reviews, formats and configures the digital content, and prepares it to be loaded onto the content delivery device in a form that can be processed by the software/firmware of the computing portion 52. In some embodiments the administrator may add digital security keys or codes to the digital content. The administrator, or another party, may load the configured digital content onto the content delivery device 50.

With continued reference to FIG. 1, each portable electronic memory storage device 40 is capable of interfacing with the exhibitor's content delivery device 50. In the illustrated embodiment, a thumb drive 40 is configured to fit into the USB port 60 of the delivery device 50 so as to interface with the delivery device 50. The illustrated thumb drive 40 does not have any computer processor, and relies upon the computing portion 52 of the content delivery device 50 for processing, read/write or the like. In other embodiments the portable device 40 may have independent processing ability, and may or may not participate in computer processing when the device interacts with the delivery device 50.

In the embodiment illustrated in FIG. 1, a vendor/exhibitor booth has a content delivery device 50 set up at or adjacent the booth. The memory portion 52 of the exhibitor's delivery device 50 preferably includes content comprising one or more electronic files of product information such as product specifications, brochures, videos, instruction manuals, sales literature and the like concerning products displayed and/or demonstrated at the exhibitor's booth. Such files may be in any desired format. For example, in one embodiment, at least some of such files are ".pdf"-type files, others are ".jpg"-type files, and others are ".wav" files. Other formats can be used as desired and as appropriate. In some embodiments, multiple files can be configured to work together.

In an example of operation in accordance with one embodiment, if an attendee is interested in a product being demonstrated by the vendor, the attendee engages his portable memory device 40 with an interface 60 of the vendor's delivery device 50. Preferably, electronic product information files of the vendor are saved in the memory portion 52 of the vendor's content delivery device 50. When the attendee's portable memory device 40 is engaged with the content delivery device 50, the vendor's product information files preferably are automatically uploaded from the memory unit 52 to the attendee's portable device 40. Once the upload is complete, the attendee removes the device from the interface 60 and can continue browsing other booths of the exhibition, each of which may have one or more of its own dedicated content delivery devices. Upon finding another interesting product at another vendor's booth, the user engages his portable memory device with the content delivery device of the chosen vendor, and thus obtains desired product information from the chosen vendor.

It is anticipated that each attendee will interface with multiple, even several, exhibitors during the course of a day or other specified time at the trade show. Thus, there will be many electronic files stored on the attendee's portable device 40. Preferably an information management software package is pre-loaded on the portable memory device 40 to help the attendee organize and use the digital content collected at the show. Preferably the information management software is configured to recognize the digital content received from the delivery device (which, preferably, has been configured by the administrator), and is configured to manage such digital content so as to provide organized and helpful access to the content to the user. The information management software will be discussed in further detail below. In other embodiments, a security key or code may be saved on the portable device 40, and the delivery device computer 52 will not write digital content to the portable device 40 unless the security code is present.

In a preferred embodiment the portable device 40 is anonymous, and has no identifying information about its user/attendee. In some embodiments the attendee is matched to his portable device 40, such as by saving his contact information to the portable device 40 upon check-in at the trade show. In one embodiment each portable device 40 has an electronic identifier such as a serial number or the like, and that serial number is matched to the attendee's identity on the computer system of an administrator that administrates the data delivery devices of the trade show. Further, in some embodiments the content delivery device 50 is configured to copy the attendee's identifying information when engaged with the portable memory device. In other embodiments the content delivery device copies the identifier of the portable device.

At the end of the show, or as desired, the attendee preferably engages the portable memory device 40 with the attendee's own computer, such as a laptop computer. The contents of the portable memory device, and specifically the product information uploaded from the exhibitor's content delivery device, are thus available to the attendee in electronic form and can be downloaded onto the attendee's computer, shared with others, or maintained on the portable device as desired by the attendee. More specifically, in some embodiments the information management software package is configured to run from the portable device without necessarily saving any data to the attendee's computer, but is also configured so that, if desired, both the management software package and the collected data can be loaded onto the attendee's computer and run locally on the computer.

In the present specification, a description of the information management software package will be described in the context of teaching a user how to use an embodiment or embodiments of the software and in connection with example screen shots. In this discussion, and the accompanying drawings, the information management software may sometimes be referred to as "Presenter", and may be discussed in connection with "Viridistor", which may be an entity that supplies and/or administers the Presenter information management software. Further, the content delivery devices may sometimes be referred to as "green boxes", and an embodiment of a portable memory device may sometimes be referred to by variations of "USB drive". It is to be understood that the terms "Presenter", "Green Box" and "USB drive" are used for convenience in the disclosure, and correspond to the broadly-defined respective terms "information management software", "content delivery devices", and "portable memory device".

Once the USB drive/portable memory device has been connected with the user's computer, the user may run the information management software directly from the portable device or may move the information management software application and content to the user's computer. With reference to FIG. 2, in the illustrated embodiment, to move the information management software to the user's computer, the user selects the File Menu, selects the Tool item and Replicator selection. FIG. 2 is a screen caption to enable the user to copy the information management software and data collected to a target location on the user's computer or, in some embodiments, a network.

Over time the user, or an organization/network with which the user is associated, may build libraries of shows, conferences and events that the user and/or others have visited, so by running the Replicator action the user will be able to build a library of the information the user has gathered. Preferably the information management software is configured so that the user can access and open data from any event that is saved to the user's computer/network. In some embodiments, if the user already has a copy of the information management software installed, the Replicator action will only copy the newly-acquired data.

The Viridistor information management software gives the user the ability to view and manage all of the content obtained from the event, in addition to viewing the Event Guide and specialty information and advertisements from the event. The information management software is a powerful tool that can be used before (in some embodiments), during, and/or after an event to plan which exhibitors the user wishes to visit and track which exhibitors the user actually visits by Exhibitor Name or Booth Location.

In the illustrated embodiment the information management software also has powerful Category filtering capabilities. In addition to pre-loaded categories, the user may create user defined categories (UDC) in addition to assigning a visual rating of one to five stars (or, in other embodiments, any other type of rating system such as rating from the number "1" to the number "3") for easy annotation of records. The user also has the option of searching for a particular Exhibitor by name using the Find command. Even if the user don't know all of the spelling of the Exhibitor name, the Find utility will present matches based upon the characters the user types in. When using the Find command, the user can begin typing just a few letters of the item the user are searching for and either selects the Find button or hit "enter." Each execution of the Find command will move the selection to the next match until the end of the list is reached, at which point the next Find execution will start from the top of the list again. By adding additional letters to the Find box, the user can fine tune the search and at the same time see matches that may be relevant. Additional embodiments may provide different and even more powerful search and find capabilities.

The information management software allows the user to print out exhibitors by category, sorted either by Exhibitor name or Booth location, in addition to allowing the user to export this information in various formats, such as comma separated value (CSV) format, to be used by other applications or devices, such as smartphone apps, database software, and the like.

In another embodiment discussed in more detail below, a Manager edition of the information management software is a more powerful version of the information management software that allows any "Manager" to pull together, or concatenate, any number of information management software sessions (i.e., information obtained at a trade show) from one or more other users, including the individual user's categories, ratings, and content they captured. Additionally, in some embodiments the information management software Manager edition has all the features of the standard information management software. In another embodiment, each instance of the information management software includes the capability of the Manager edition, but such capabilities are only unlocked upon entry of a particular code or authorization.

Figure 3:
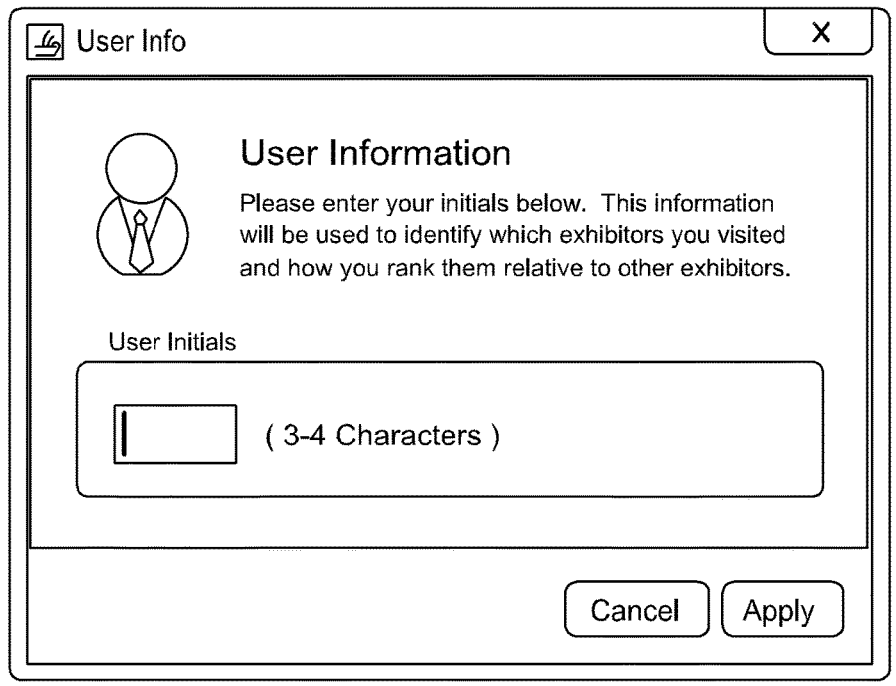
FIG. 3 shows a screen shot from a user computer when entering user information.

In the illustrated embodiment, the user starts the information management software by double clicking on the Viridistor information management software on the USB device. With reference next to FIG. 3, the first time that the user starts the information management software, a dialog box will prompt the user to enter User Information that is a user identification—the user's initials in the illustrated embodiment. The user's 3 to 4 initials will be used to identify the content, ratings, and categories that the user has gathered on the USB drive. The user may have the ability to change the user's initials at any time via the Tools, Preferences on the menu bar. In other embodiments, other modes of identification can be used, such as formally registering the software with the software provider, and taking identification data from such registration.

Figure 4:
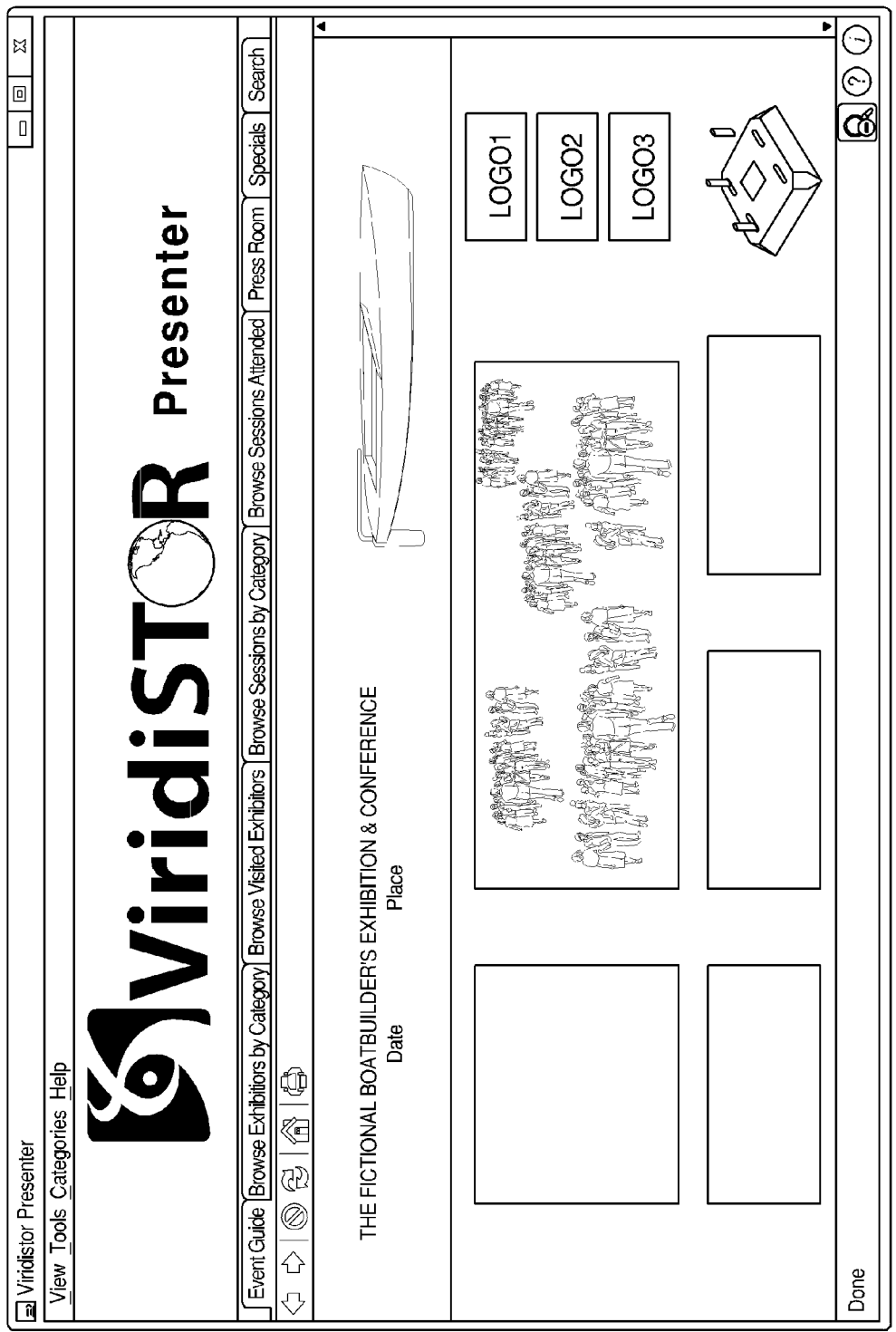
FIG. 4 shows a screen shot from a user computer showing a home page of an information management software.

With reference next to FIG. 4, in the illustrated embodiment the default screen is an event summary or event guide. In the illustrated embodiment the information management software is directed to a trade show and conference, and comprises eight tabs: Event Guide, Browse Exhibitors by Category, Browse Visited Exhibitors, Browse Sessions by Category, Browse Sessions Attended, Press Room, Specials and Search. Other embodiments may have more or less tabs.

The first and default tab is the Event Guide. Preferably information about the event is launched from this page, which may include the electronic equivalent of the event or conference guide, a link to a guide of conference sessions, a banner graphic representing the particular trade show, space to include a list of sponsors, which may include logos, a photograph of the floor of a previous, or the current, trade show, a summary description of the theme of the show, and spaces for advertising. The illustrated Event Guide page also includes a banner for the information management software itself. It is to be understood that, in other embodiments, the default page may have a different configuration with more or less advertising and arranged in other configurations. For example, in one embodiment it includes a link to video media describing the history of the event. In another embodiment one or more advertising banners or blocks are configured to display a different advertiser each time the page is accessed. Still further configurations of the page are anticipated, so that the page can be designed to the desires of the event producer.

Figure 5:
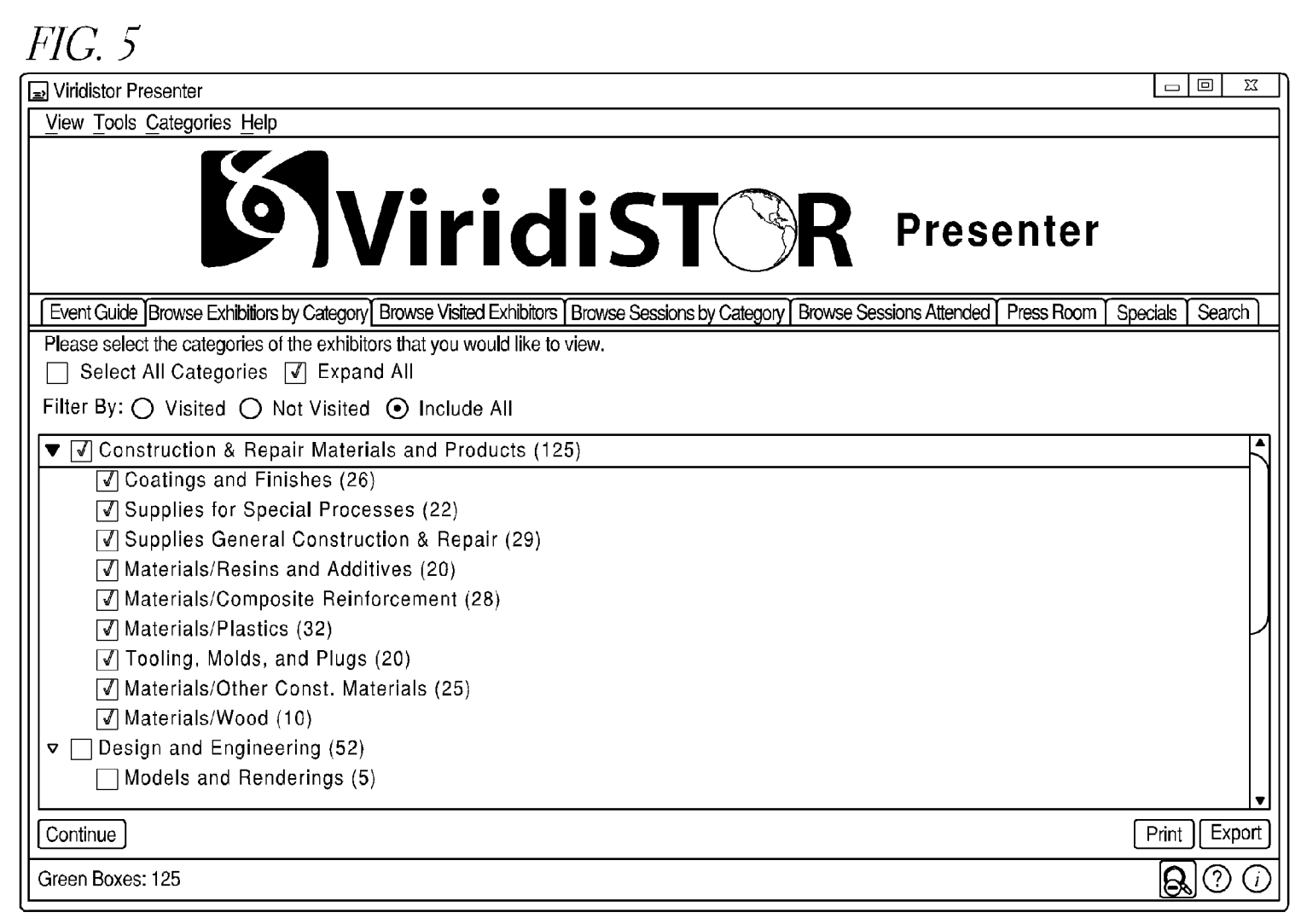

With reference next to FIG. 5, the Browse Exhibitors by Category tab takes the user to a page that allows the user to view all of the exhibitors of the event, filter by only the exhibitors that the user has visited, or selectively choose which category or categories the user wish to browse. This page includes options for managing filters, and also lists categories and subcategories that, in one embodiment, have been established by the event administrator.

Preferably, vendors/exhibitors have self-classified their products in relevant categories prior to the show, so each exhibitor is linked to a plurality of categories. Notably, information about every trade show exhibitor that has opted to be included is listed by the information management software, whether or not the user has visited the exhibitor's booth.

In some embodiments information about each exhibitor is provided by the exhibitor to the administrator, and the administrator configures the information and loads certain, limited information onto the portable memory device in a manner so that it is recognized and managed by the information management software when the software is run on a user's computer. In a preferred embodiment, and as will be discussed in more detail below, the digital information preloaded onto the portable device is more summary in nature than the digital content loaded onto the exhibitor's content delivery device. The portable device obtains the more detailed digital content when the user visits the exhibitor's booth and interfaces his portable memory device with the exhibitor's content delivery device. However, preferably summary information about each exhibitor is preloaded onto the portable device with the information management software.

With continued reference to FIG. 5, the Filters include "Visited" which filters the list by only the trade show exhibitors that the user has visited (meaning, the user has interfaced the user's USB drive with that exhibitor's content delivery device); "Not Visited," which filters the list by only the exhibitors that the user has not visited, and may wish to, and last "Include All", which is the default setting that includes exhibitors/sessions that the user has and have not visited. As the information management software supports events that may have "primary category/secondary category" classifications, the "Expand All" opens the entire tree of the structure to view the information. Note that other embodiments may have more or less classifications. Also, in other embodiments the user may filter by other factors, such as by vendors the user identified before the event as vendors the user wished to visit, by key words found in vendor summaries, or the like.

In the illustrated embodiment, a number surrounded by parentheses is placed to the right of each category which represents the number of exhibitors for that category. Each subcategory also preferably tells the user how many exhibitors were in the subcategory. Once the user has selected the categories and which filter the user wish to apply, the Continue button becomes active. Clicking on Continue activates the viewing pane of this tab.

Figure 6:
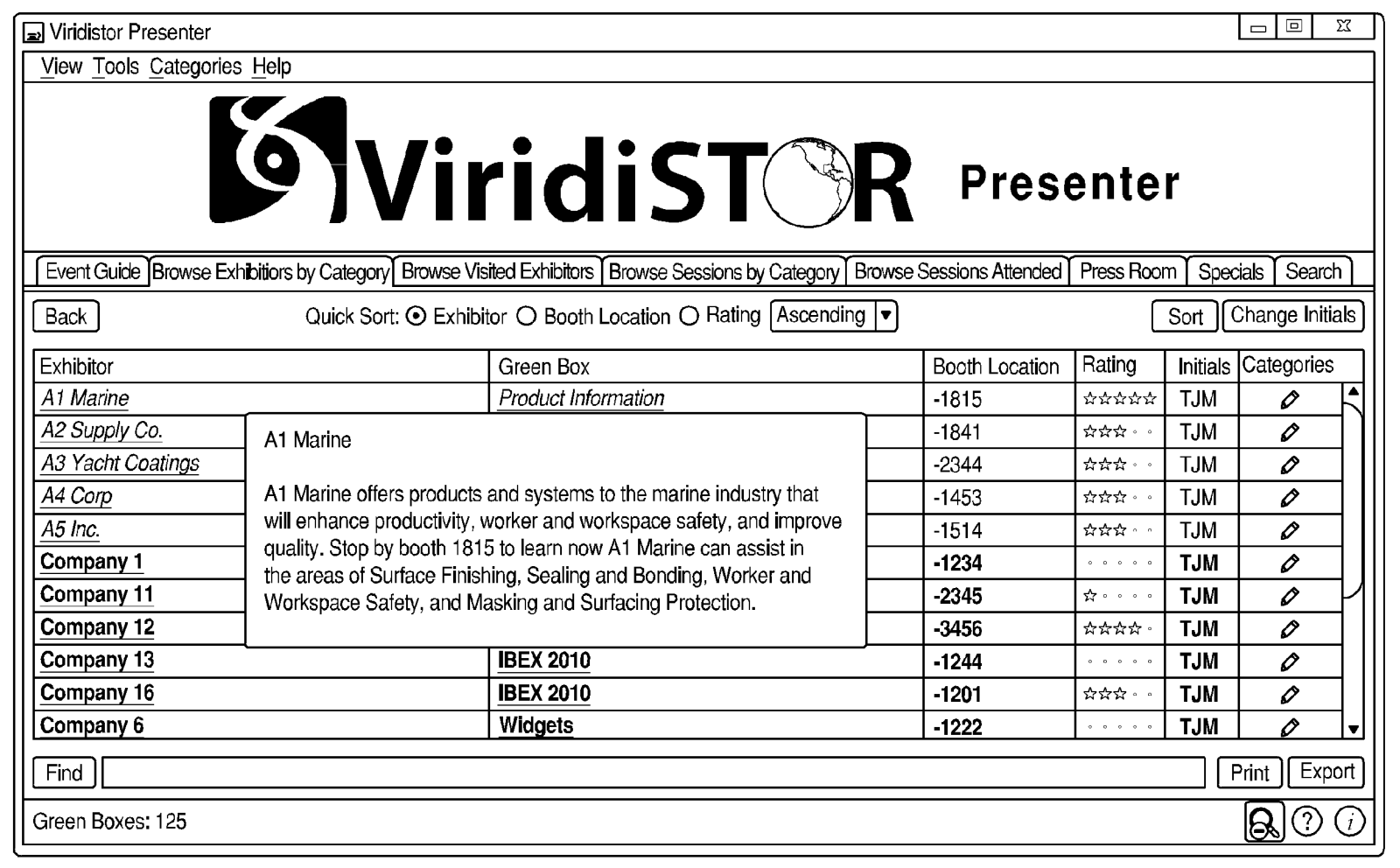

With reference next to FIG. 6, an embodiment of a viewing pane is shown. In this example, "Construction & Repair Materials and Products" was selected, which has 125 exhibitors in this category. The user will also note that in the lower left hand side of the window that "Green Boxes: 125" is indicated. This tells the user that in this category, for example there are 125 content delivery devices where information in this category was available. In many events, exhibitors will have more than one content delivery device in their booth, some with the same information and some with a different selection of data, but may share the same category or categories.

The illustrated pane includes a Back button that can be used to take the user back to the previous page to modify the user's selections. The information management software also has the ability to quick sort the information by Exhibitor Name, Booth Location or Rating. This is accomplished by simply selecting the appropriate button.

In the illustrated embodiment there are two fonts in the display of information. If an exhibitor has been visited, they will appear in non-italic bold. If they have not been visited, they will appear in italic non-bold font. In the Exhibitor column, the user is presented the name of the exhibitor. When the user "mouses over" the exhibitor name, which means move the mouse pointer over the item, a tool tip box opens with the exhibitor synopsis (the same would go for conference sessions). In a preferred embodiment as the user moves the mouse up and down the list, the line is highlighted to ease in viewing all the information.

On the lower left section of the pane is the Find button and window. The Find allows the user to search and find information from all of the fields. The Find command also allows the user to type just some of the letters of the target the user are searching for. To execute the Find, type in just a few letters and click Find. The Find will take the user to the first instance of the match. Additional clicks on Find preferably will take the user to the other matches.

Each content delivery device can have a name as provided by the exhibitor. The name may be an internal code or can describe the product information available from that content delivery device. In the illustrated embodiment that name is listed in the "Green Box" column. When the user mouses over the name of the content delivery device in the "Green Box" column, a "tool tip" box opens with a synopsis of what particular content was loaded from this particular content delivery device. This is very useful when exhibitors use more than one content delivery device to deliver content.

Figure 7:
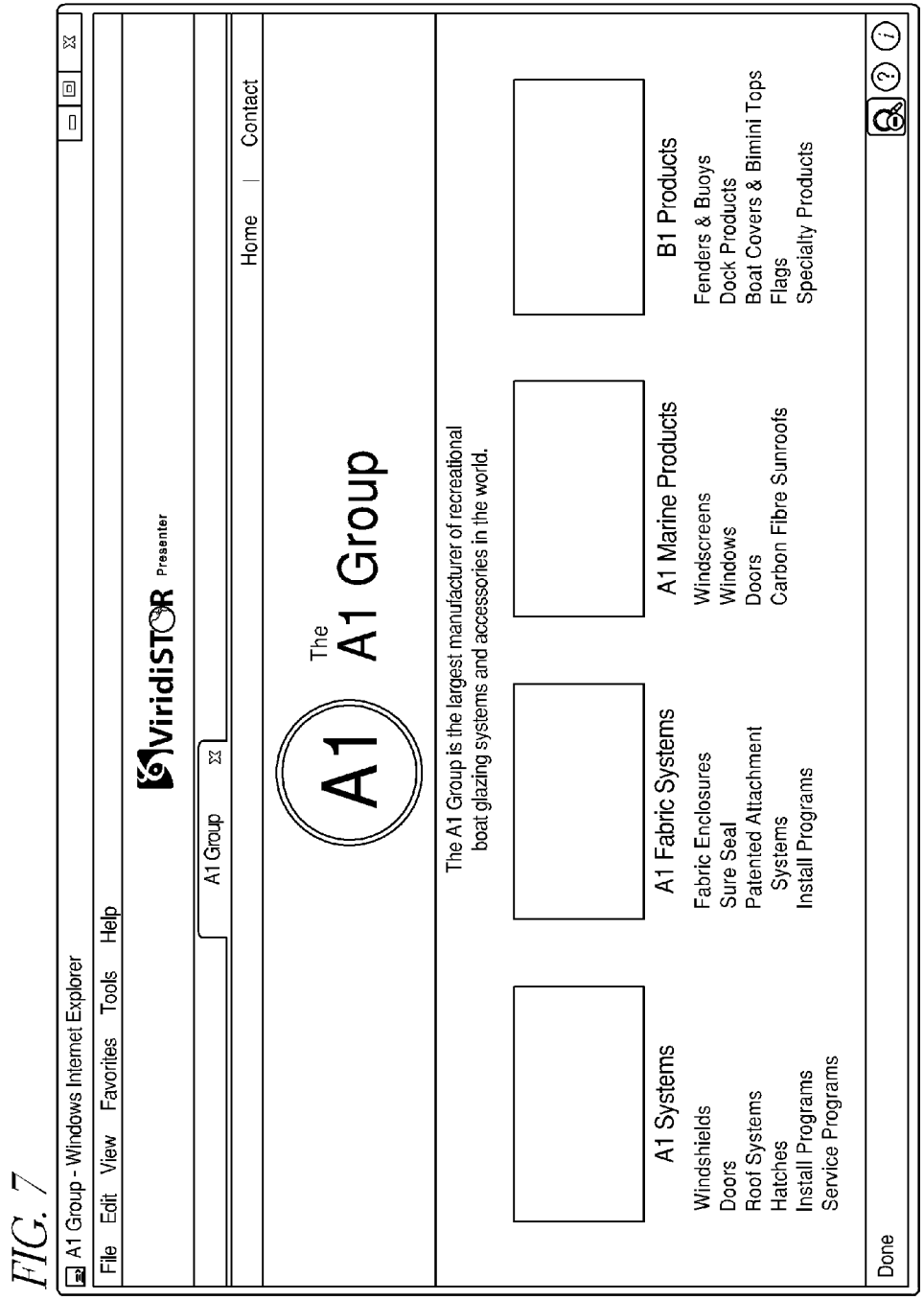
FIG. 7 shows a screen shot from a user computer showing a landing page of an exhibitor's delivered digital content in accordance with an embodiment.

When the user clicks on the bold link in the Green Box column (which corresponds to a content delivery device the user visited and obtained data from), it opens a browser session and loads the content that is on the USB drive (which is the digital content the user obtained from the exhibitor's content delivery device at the event). In the illustrated embodiment the browser session is opened in another software package, such as Microsoft® Internet Explorer®. FIG. 7 illustrates an example of a page displaying digital content. For example, the digital content provided by the exhibitor may include a graphical home page interface (as shown) with the exhibitor's trade mark, logo and the like. The graphical home page may also include links to specific products and/or product families, business subdivisions or the like. These links lead to further pages of digital content, which is present on the USB drive and was obtained during a user interface with the exhibitor's content delivery device. In other embodiments the digital content may be organized in more or less detail and ease of use, as preferably the content is supplied by an exhibitor, not the digital content administrator. Further, the USB drive may include a link that will contact the associated exhibitor and initialize an online sequence that will update the information stored on the portable memory device (which was originally distributed at the trade show).

With reference again to FIG. 6, in the illustrated embodiment, for both the visited and not visited exhibitors, if the user click on the link of their exhibitor name, instead of launching and presenting the content on the USB drive (only for those visited), instead it will launch the browser and take the user directly to the Internet and the exhibitor's corresponding website. In many cases, exhibitors will create a special "landing page" specific to the event. As such, no exhibitor at a trade show is ever completely missed by a trade show attendee who obtains a portable device, and for those who were visited, the information and or content can be instantly "refreshed" when they visit the live site of the exhibitor from the link provided on the USB drive.

The Booth Location column presents the physical booth location information for the exhibitor. Depending upon the event, it will either be the name of a room/conference room, hall and booth number, or simply a number of a booth where the exhibitor is located.

The Rating column may be used to assign a visible rating for each exhibitor, visited or not. In the illustrated embodiment the user may mouse over the number of the stars the user wishes to assign for the exhibitor and click to lock the user's selection in. If at any time the user wish to remove all star ratings, simply right-click and select "Remove Ratings."

In the illustrated embodiment an Initials column indicates which user participated in obtaining/creating content associated with an exhibitor. For example, if a particular user visited a booth and obtained digital content on his portable device, or if the user entered a rating for the exhibitor/booth, or some other entry, the user's initials (or, in some embodiments, another identifying indicator) will be associated with that entry. In some embodiments more than one user's initials may be tracked in connection with an exhibitor entry. For example, one user may visit the exhibitor's booth, and two or more user's may have entered a rating of the content, added a category, note or the like.

Figure 8A:
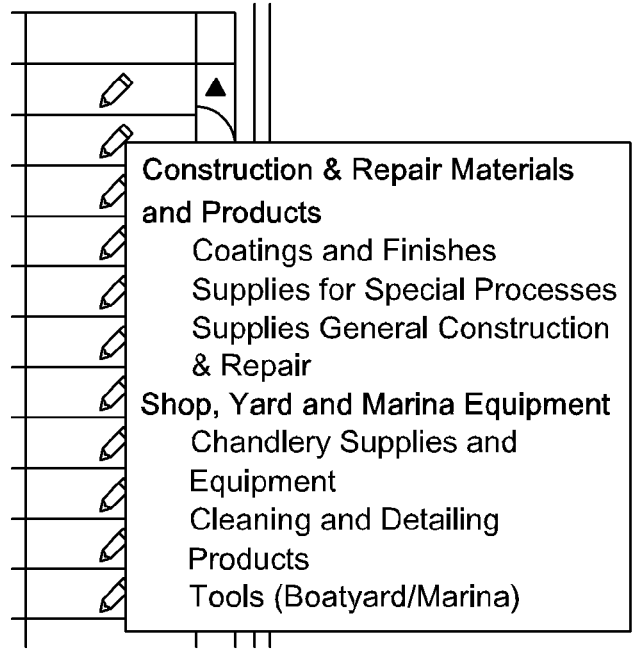
FIG. 8A shows a screen shot from a user computer showing categories applied to certain digital content in accordance with an embodiment.

With additional reference to FIG. 8A, the last column in the illustrated embodiment is the Categories column. When the user mouses over the icon in the column, a tool tip opens with the categories that were set by the exhibitor. As will be discussed in more detail below, User Defined Categories can be set by the user of the information management software. In FIG. 8A, the bolded text represents the primary category, and the non-bolded text represents the subcategory. In one embodiment the user does not have the ability to change the categories the exhibitor selected for its company. In other embodiments the user can change categories as the user sees fit.

With additional reference next to FIG. 9, in another embodiment the user may create User Defined Categories, or UDCs, by clicking a "Modify Categories" button, which will open a box as shown in FIG. 9, which will allow the user to add or delete UDCs as the user see fit. The "Modify Categories" option may be a button on the user interface, may be available from a pull down menu such as the "Tools" pull down menu, and/or may pop up upon right-clicking the "Categories" column. UDCs can include unique words or phrases to allow for intuitive use and their ability to be used in Power Searches (discussed in more detail below). The user may name a new category in the "Create Category" box. Upon then hitting the "+" (plus sign) the new category will appear in the UDC category window.

Figure 8B:
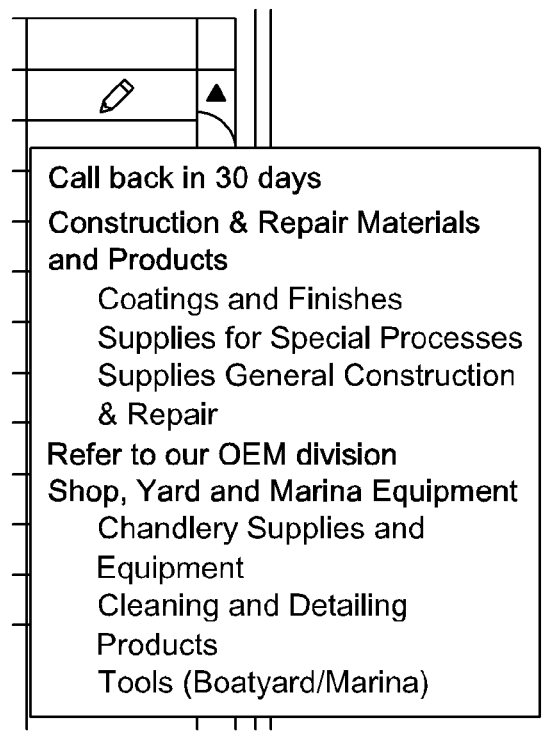
FIG. 8B shows a screen shot from a user computer showing categories as modified by a user in accordance with an embodiment.
Figure 8C:
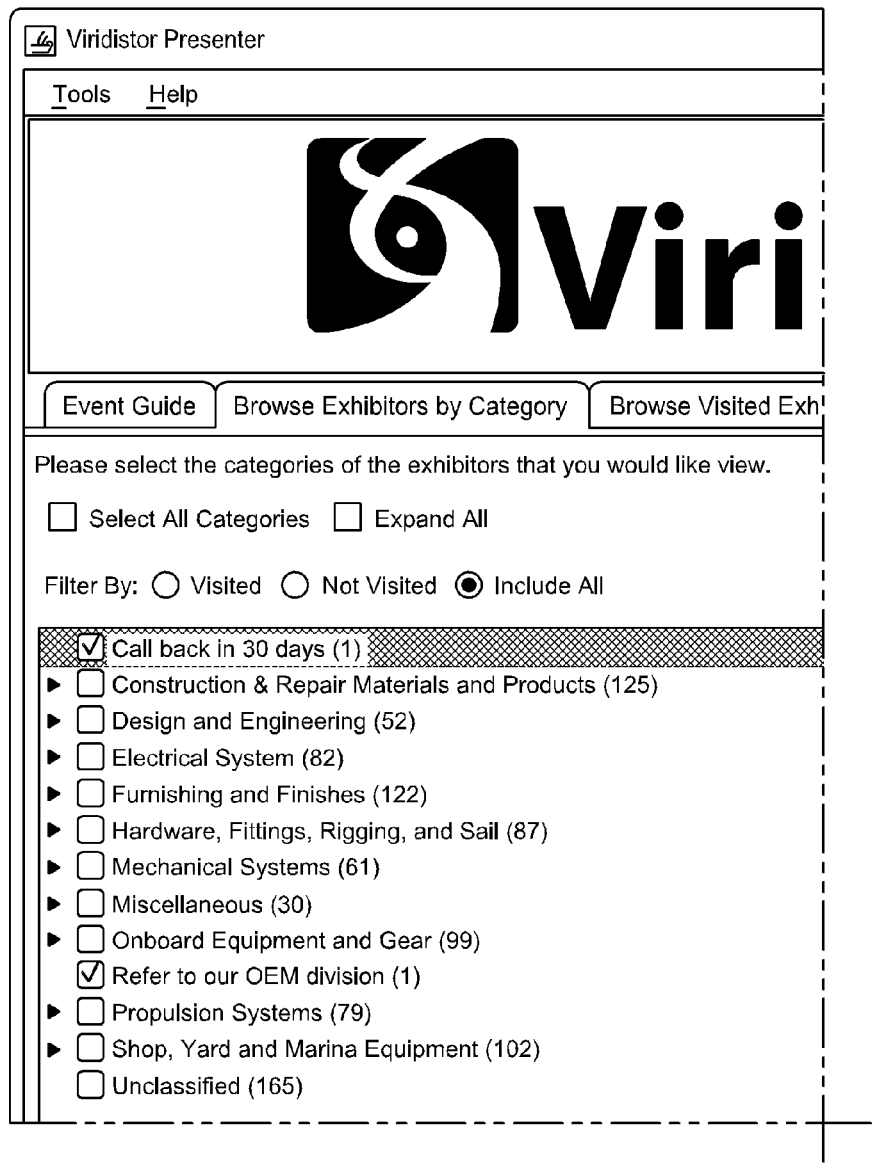
FIG. 8C shows a screen shot from a user computer showing modified categories used to manage digital content in accordance with an embodiment.
Figure 10:
FIG. 10 shows a screen shot from a user computer applying user defined categories to digital content in accordance with an embodiment.

With additional reference to FIG. 10, once the user has created one or several UDCs, the user can then select one or more UDCs to be assigned to a particular exhibitor by accessing an "Exhibitor Categories" box, which preferably is accessed via clicking the associated "Categories" icon. With reference next to FIG. 8B, the selected UDCs are now included in the Categories corresponding to that exhibitor. Further, as shown in FIG. 8C, the information management software allows the user to search by UDCs.

Preferably advanced sorting techniques provide for flexibility in the sorting and use of information. Multiple criteria and complexity can be employed in sorting.

It is to be understood that, in other embodiments, different categories may be shown on the viewing pane. For example, in another embodiment the "Initials" column is not shown, but the initials associated with particular digital content are displayed when the user clicks or, in some embodiments, mousse over a particular box. Other manners may also be provided to show association of a particular user with particular information. In further embodiments users may, for example, denote particular digital content as a "Favorite". A column may be provided for such a rating, and of course whether certain content has been denoted a Favorite may be used for search criteria. Further embodiments may include a "Notes" column, which enables users to make and save notes or comments concerning particular digital content. Still further information may also be collectible and displayable in the viewing pane, and may also be used as search criteria.

With reference again to FIG. 6, information from this screen can be printed or exported to another device such as a smart phone in one or more formats, such as CSV or HTML format. The format can be changed as desired for the application. For example, with reference next to FIG. 11, a format for use with a smaller smart phone screen condenses information and displays less columns of information than does the full screen version. In some embodiments the user can select which columns will be exported.

Preferably the tab leading to Browse Sessions by Category enables management of data related to conference sessions in a similar manner to that of exhibitors. Events having no conference sessions or the like may not include such a tab in the corresponding information management software. Notably, in events with conferences, in one embodiment the user interfaces with a content delivery device when entering a particular conference session, and thus receive digital content such as handouts and the like that are relevant to the session.

The Browse Visited Exhibitors or Browse Sessions Attended tabs allow each user to browse all the exhibitors/sessions the user has visited, or only those of a particular category.

Figure 12:
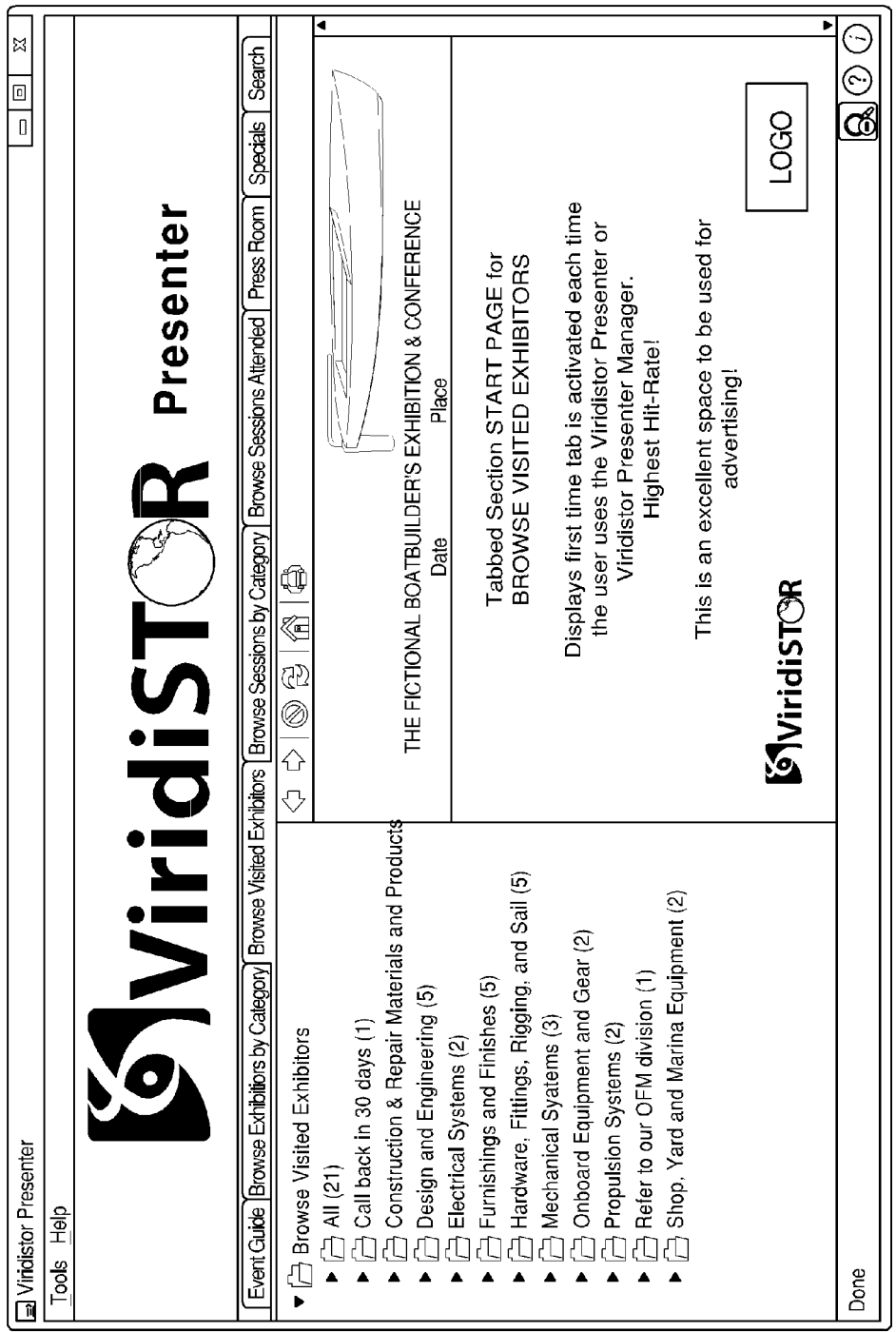
FIG. 12 shows a screen shot from a user computer showing a home page corresponding to a tab of an embodiment of information management software.
Figure 13:
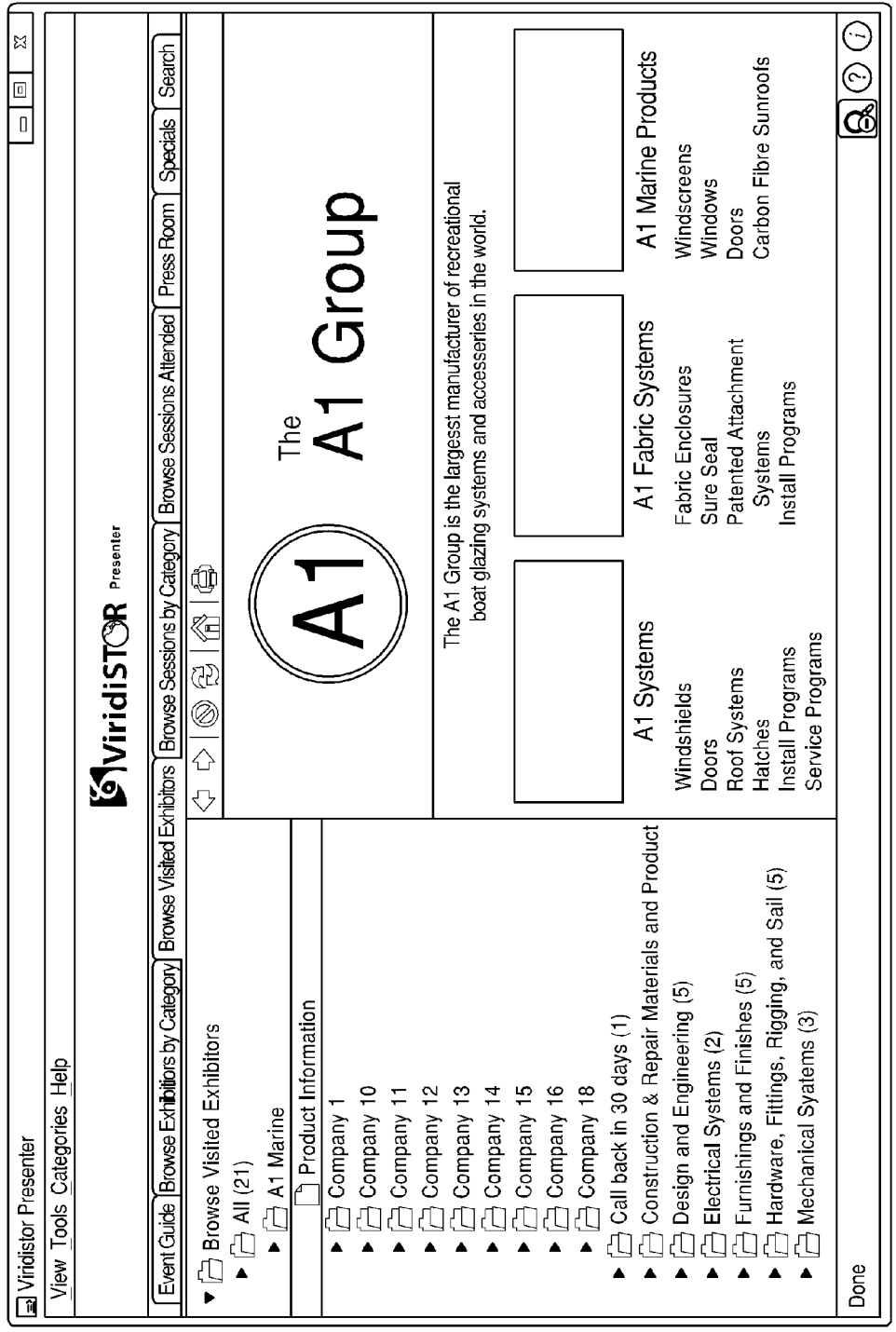
FIG. 13 shows a screen shot from a user computer showing digital content delivered and corresponding to a category tree in accordance with an embodiment.

With reference next to FIG. 12, in one embodiment when the user activates or moves to Browse Visited Exhibitors tab, the user is presented with a splash screen of content provided by the event (and preloaded onto the portable device), which may include advertising space, instructions, links to comment pages, and the like. There is also a category tree, with an indication of how many exhibitors in a particular category were visited. FIG. 13 shows an embodiment in which clicking on one of the category folders expands to folders for each visited exhibitor in that category, and clicking on one of the exhibitors (here "A1 Marine") expands to a link to that exhibitor's Green Box(es) (here named "Product Information"), which in turn prompts display of a home page corresponding to digital content obtained from the exhibitor's content delivery device at the event.

It is to be understood that the presentation of the content being fronted, in this case via an HTML page, can be performed in different methods and styles. As discussed above, this content is provided from an exhibitor to the administrator. The illustrated embodiment uses a template configuration in which the administrator system automatically offers to exhibitors choices of style and number of items of content (for example, an exhibitor wants to include 1, 2, 3, 4 or some other number of PDF, JPG, PPT or other types of files). Upon submitting digital content to the administrator system in accordance with one embodiment the exhibitor may optionally select one of the suggested templates and plug content into selected locates. The administrator system preferably generates a generic HTML page to present the content incorporating any metadata descriptions, company logos, images, etc. that is provided to the system by the exhibitor. In essence, in one embodiment, the administrator system enables exhibitors to automatically set up pages presenting the digital content for an event. Other embodiments may employ other ranges of automation. For example, in another embodiment the exhibitor creates its own HTML front end with custom graphics etc. and then uploads it all to the administrator system. In any case, the information management software, in all embodiments, displays the information and provides a user interface enabling access to the digital content.

We reference again to FIG. 6, and as discussed above, in some embodiments the exhibitor's name in the Exhibitor column of the viewing pane is a link to an exhibitor website. Once the user has opened such, the user has the option of creating a bookmark or favorite in the user's default browser. It is anticipated that the user can build folders and subfolders of favorites or bookmarks to manage the exhibitor websites in any way the user may wish. Thus, the information management software can be used in conjunction with other software packages.

Some embodiments offer advanced search capability, including all columns of displayed content, all linked content, metadata of the synopsis of the exhibitor, the synopsis of the content delivery device content, stock and user-defined categories, etc.

With reference to FIG. 14, in one embodiment, search results are presented in the same format as the page before searching, except that an indicia (such as a dot in the illustrated embodiment) is placed next to the link that contains the matching subject matter. Notably, at least one (and often more) link for a given exhibitor may include matching subject matter.

It is to be understood that the search capability may include the electronically searchable "content" that is gathered by any means via the systems approaches noted herein, and can, in some embodiments, be expanded to include referenced remote content (such as an Internet website or other repository linked in the information management software) of the particular participant. For example, in one embodiment the search examines the content that was captured via the insertion of the USB device into a particular exhibitor's content delivery device and the content preloaded to the portable device. That electronic data (PDF, Word, text for example) can be searched, indexed and made more useable through the information management software interface. An option to broaden the search to "remote" content can be user selectable. For example, if the data from the USB contains a link to a web page, the search utility can open the web page and apply the search criteria. All of these parameters and choice add to the value and functionality of the system in general, and through the use of optional social media options (see later in this document), the "network" of information is boundless and provides an ability to use information based upon a myriad of choices, opinions, recommendations, etc.

In some embodiments, a Press Room version of a USB drive will only be distributed to authorized members of the press, and only the Press Room version will include a "Press Room" tab. The Press Room tab preferably provides access to digital content not available to a typical attendee and not preloaded on other portable devices. For example, exhibiting companies and presenters of sessions often create press kits that contain everything a reporter needs to write a bang-up story about the user and the user's company. The Press Room USB preferably contains the Event Guide, Browse Exhibitors by Category, Browse Sessions by Category, Press Room, and Specials tabs. The typical Press Room will include press content segmented by exhibitor and session information management software, when applicable, and may follow the same tree structure display of "all" and by individual categories. The individual press kit can be as simple as a single HTML page with text or a link to content or more complex and organized by pages with different aspects of the company or information management software that the press should be aware of. In other embodiments a Press Room tab is included in all USB drives.

In some embodiments, a Press Room USB drive can't be used on the show floor and inserted into the content delivery devices and capture content. Further, depending upon the event, attendees of the event to visit the trade show floor will receive an Exhibit Floor USB and attendees of a seminar or conference will receive a Sessions USB. Thus, attendees who register for the Exhibit Floor may only capture content from the Exhibit Floor and not the Sessions, and vice versa. Attendees that have registered for both the trade show floor and sessions will receive a USB enabling content capture on both the Exhibit Floor and Sessions or may receive a single USB for each of the Exhibit Floor and Sessions. These USB drives will have the appropriate authorization codes and language codes on them to capture content.

In still further embodiments, the information management software may have a "Specials" tab. This section may hold advertisements, new product announcements, or "show specials" for any of the exhibiting or presenting participants of the event, and may also have a category tree structure. The size of the content of the Special is limited, and in some embodiments is separate from what an exhibitor would submit for its content delivery device or for its summary information for the portable device. For the Specials tab the participant/exhibitor will create an impactful message with links that may use an Internet connection and/or include "promo codes" enabling a user to participate in discounts or other promotions that are shown on the Specials tab. Preferably exhibitors will pay extra to be included on the Specials tab, and particularly to be featured on the home page of the Specials tab. In some embodiments, advertisements in the Specials tab can be open to entities that are not necessarily exhibitors. For example, a restaurant near the conference center may place an ad and/or offer a digital coupon to trade show attendees.

In some embodiments the information management software can be configured to run on a network, so that multiple parties can access the content of any one other user. For example, multiple users may attend the same trade show, but with directions to interact with different exhibitors. Each user may load the content she collected to the network, and each of the users can access all of the content, ratings, notes and the like obtained by the other users.

In further embodiments the information management software can be configured with a "manager" mode, in which a particular user has greater access rights than other users. Access to manager mode may require a password, and may also require a subscription and registration of the software.

Figure 15:
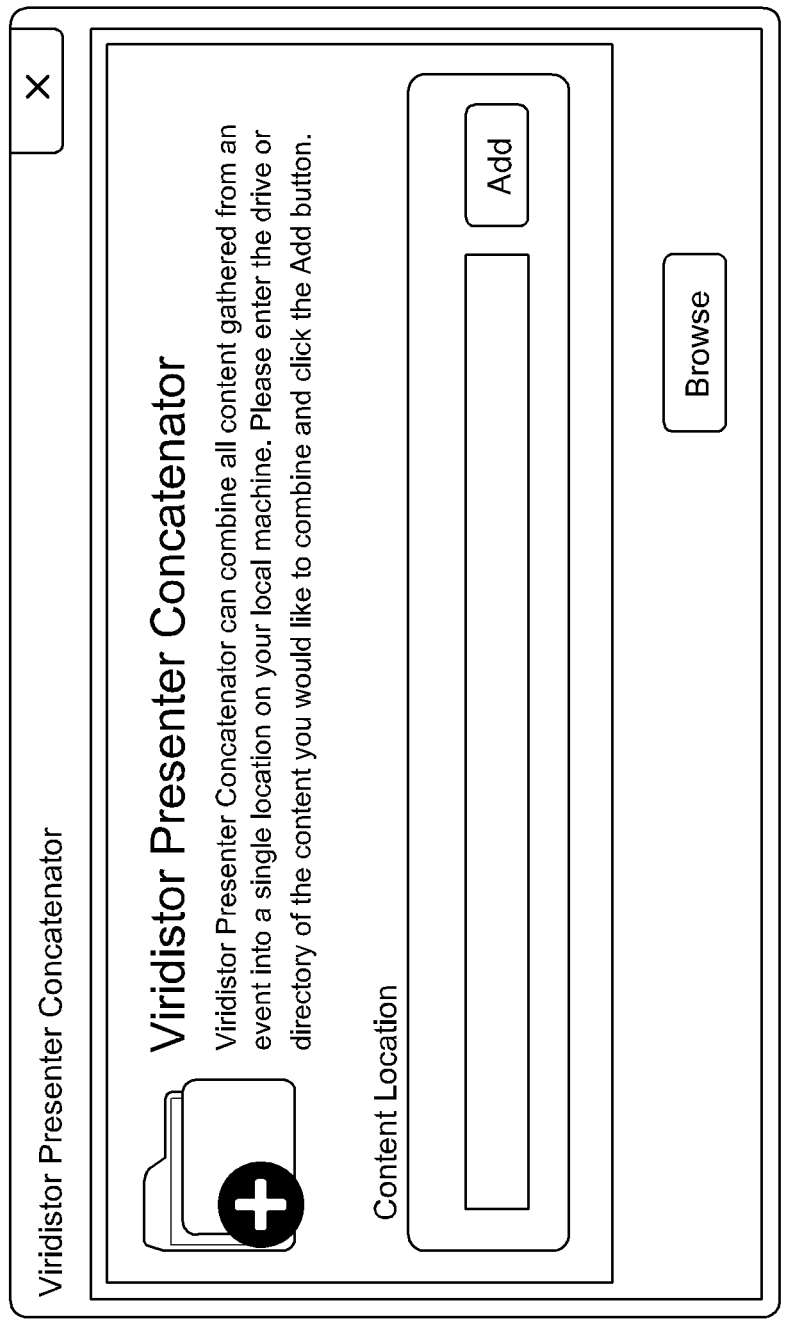
FIG. 15 shows a screen shot from a user computer showing a prompt for concatenating disparate digital content with a single information management software embodiment.

With reference next to FIG. 15, in manager mode, the information management software may concatenate diffuse content obtained by other users, and may store and/or restrict access to that content to the manager. In this context, concatenating diffuse content about a particular trade show involves presenting the content obtained by multiple users as one collection. The manager can then use the information, along with data tracking of which user obtained the information and/or made a rating, note or judgment of a particular exhibitor. The superior rights of the manager mode also enable a manager to override data such as ratings. Also, the Manager may assign his own ratings and/or user defined categories (some embodiments may keep a record of the originally-assigned ratings). Other users may be granted varying degrees of access and editing authority as determined by the Manager.

In some embodiments, each concatenated data set imports at least: the initials of the associated User; Language-specific content and menus including, but not limited to the Event Guide, Splash Screens for tabs, Specials, Press Releases, etc.; and optionally, the user interface language strings to present the program's instructions in the supported languages. (i.e., it may pull over all content that is not in the default language of the information management software running in the Manager mode and currently available on the User collection; "not visited" or "not attended" listings, but preferably only if the user has rated or created user defined categories for that exhibitor or session; and the actual collected data (exhibitor, session, press, etc.) in the language of the USB, up to and including different language versions of the same "visited" or "attended" exhibitor/session.

The information management software application can run on a designated system of communicating (wirelessly or via a physical connection etc.) to a smart phone or other device where the user can 'on the fly' select ratings and 'check off' that they inserted the stick and collected information from booths/conferences/exhibitors etc. in real time (in some embodiments the manager may also monitor the progress and activity of employees at the trade show). In some such embodiments, a third party app or mobile version of the information management software is loaded on the smartphone, which communicates electronically with the manager.

Further, in some embodiments, a user, manager or enterprise can determine their own User Defined Categories (UDCs) prior to an event. These UDCs can be defined in the information management software Manager mode. The information management software Manager will then automatically access the user information management software applications connected to the network and update the UDCs through wireless and/or cloud computing.

In another embodiment, the information management software will support the integration and access to social media such as Twitter, LinkedIn, email, Facebook, etc. via an easy access icon. The user of the information management software may fill in a registration of their own social media information when they use the information management software application. Then, by clicking on the social media icon of the particular exhibitor or presentation, the user of the information management software will be able to access the type of social media that is available for that exhibitor or presentation.

With reference next to FIG. 16, in such an embodiment, the viewing pane of, for example, FIG. 6, may be modified to have a column with links to social networking sites. A particular exhibitor may have several social media options in addition to a direct link to email. In the example, the user selects or "clicks" on the SOC icon (this could be a graphical icon for said action as well). Links to the different social media types available for that exhibitor (which preferably were supplied by the exhibitor when supplying content to the administrator) are then presented, from which the user may select the option they wish to "subscribe" or act upon, or simply to access the social media corresponding to that exhibitor.

This type of support is not limited to social media, but any other "external" command or type of action. For example, in another embodiment an icon may be provided that prompts interaction between the information management software and, for example, a business enterprise's customized software that manages vendor relationships. In this example, clicking the icon sends information about a particular exhibitor to the enterprise software and initiates a process to have the exhibitor approved as a vendor for the company based on information managed by the information management software. Another example would be selecting to have the user of the information management software send his/her vCard (Short for virtual Card or electronic card), which is a specification that defines the format of an "Electronic Business Card." vCards are often attached in e-mail messages, but can also be exchanged through other ways on the World Wide Web. Usually a vCard will contain a business name, address, phone number, URL, logo and other business information.) Thus, as just discussed, it is contemplated that the information management software may positively interact with other software programs in both a public and nonpublic context. An exhibitor may supply its vCard, or contact information similar to that of a vCard, while supplying digital content to the administrator, and links to the contact information may be presented in the viewing pane.

Still further embodiments may include one or more other features or may have some structure differing from the specific embodiments discussed herein. For example, in some embodiments the information management software application may run, or a version of the information management software may run, on pad or tablet devices, in addition to smart phones or other computing devices. In other embodiments the information management software application (with trade-show-specific information) may be available for download (or use in "cloud" computing) before the trade show. In one such embodiment the user may receive a code for accessing such information only after completing his registration and, in some cases, paying a fee. Alternatively, the fee can be avoided by agreement to allow the administrator to share certain information about the User with specific exhibitors after the event so as to provide leads to the exhibitors.

Further, rather than work with a portable memory device and a content delivery device, the trade show and/or administrator may run a Wi-Fi system dedicated to information transfer to users' information management software applications. Transfer would be triggered when a user electronically indicates an interest in an exhibitor's product such as by inserting a USB, scanning a UPC code (by the exhibitor) or by the attendee using an electronic device such as a smartphone or the like to interact with electronic an electronic device at an exhibitor's booth.

In additional embodiments, the information management software can include versions for laptops, networks, smartphones, tablets and the like, and may also be configured to integrate with other (and potentially third-party) applications running on smartphones, tablet PCs or the like. As such, through the use of applications running on smartphones or tablet PCs, the rating, categorizing, and notation of exhibitors being visited or not can be exchanged between the portable device and the information management software application running on the user's computer through an online and/or cloud connection. That information can be such that the user can rate, categorize, etc. a particular set of exhibitors or conference sessions to attend, and then have that action transferred to the smartphone or tablet computer and, in some embodiments, have a tentative schedule developed to enable the user to most efficiently accomplish her plans. Also, as the user of the smartphone or tablet PC application walks the floor of an event, they can rate, mark visited, categorize, etc. the exhibitors or sessions that they interact with, and transfer that information back to the computer hosting and running the information management software application.

In further embodiments, a user can create their own schedule for visiting specific booths, and view the schedule on a smartphone, tablet computer or the like. In some embodiments, through GPS the user can track their progress through the show and be prompted by their smartphone what exhibitor to visit next and where the exhibitor is relative to the user's current position.

In yet another embodiment, the digital content obtained by the User would be time bombed or copy protected. For instance, the content would only be accessible with an access code or password that the user may obtain at the event, or may pay extra to obtain. Also, in some embodiments, the information management software application could cease to work at a predetermined time and/or after being opened a specified number of times unless a password is provided. A password can be obtained by paying for and/or by registering the software. During such registration, preferably the administrator collects demographic information about the user and, in some embodiments, obtains the user's authorization to track user use of the information management software. Also, in some embodiments no password is needed, but the software will not function until it is registered.

In still further embodiments the information management software application could also contain logic to not allow the unauthorized copying of content to another device or location. (i.e., it would work only on the authorized USB or whatever device the software is delivered and data accumulated upon).

Additionally, in some embodiments the information management software will analyze the patterns of data accumulated by the user and suggest other exhibitors or sessions for the User to visit. In still further embodiments, based upon such suggestions the information management software may access an online database to download content on exhibitors that weren't visited but which the information management software determines would be of interest to the user.

It is to be understood that the embodiments and features discussed herein are not limited in application to trade shows. Rather, the trade show is presented as a convenient way of showing examples of features. In fact, it is contemplated that each of the features discussed herein can be used independently or in selective combination with other features discussed herein.

In further embodiments the information management software can also be used with or without content delivery devices, and in some embodiments without portable devices. For example, in one embodiment a USB drive or other portable memory device is supplied to attendees at an event such as an educational conference, internal or external training, small trade show or the like. The portable memory device is preloaded with information management software and with detailed digital content regarding the presentations, sponsors, exhibitors or the like as appropriate without the need of interacting with any content delivery devices. In other embodiments the information management software can be downloaded directly to a user's computer from the internet without any portable device being involved, and digital content can also be downloaded from online or remote sources, but in a format that can be managed by the information management software. Further, aspects of the system and software discussed herein can be used in many applications, including for example, real estate, Retail, Education, Hospitality, etc. and it is not limited in any way to the type and or variations of business uses it supports.

In another embodiment, a website can be set up to host all of the exhibitor or session information of a trade show or other event, and each attendee can set up his own online registration (preferably with security) for the event. An app would be available for use on a processor-enabled portable computing device such as a smartphone or tablet PC, which app would have an electronic validation system (such as RFID registration, TAG or QR information capture, near field communication (NFC) or other form of validation) so that said validation or authorization would have to be obtained with permission (security) from the exhibitor or session. For example, the portable device running the mobile app would use the validation system to "bump" with an electronic device at the exhibitor booth. This validation or bump would be a way of determining if and when the user has visited an exhibitor or attended a session, and an electronic token or the like can be provided to the portable device upon visiting/attending.

As the user visits the exhibitors or attends the session, he obtains the electronic validation on his smartphone or tablet, or some kind of electronic token noting that he had attended the session. Additionally, preferably his portable device would include the mobile information management app having the ability to rate, categorize, etc. the exhibitor or session. When completed, or at any convenient time, he would then send or bump the requests for information to his web- or cloud-based account, which has been or will be set up on the Viridistor digital content administrator server.

Upon completion of uploading of his request, he would then have the ability to "view" and "use" the content that is tied to his requests, either online over the Internet under the control of the information management software running "on the cloud", or have the option of having all of the content that he was authorized to obtain downloaded to his local computer, along with the information management software application, which then manages the information to allow for all of the functions of management of what would otherwise be disparate information. Thus, information management software installed on a localized computer can interact with and be updated via an app running on a smartphone or other processor-based portable device.

This embodiment would also support the ability to collect information in different language versions, if available, in addition to interacting with "other users" as noted in the information management software Manager mode. For example, the user may register with a preferred language, and the exhibitor may prepare digital content in multiple languages. In such embodiments the software is configured to recognize the user's language preference and deliver the preferred-language digital content. Also, this same ability would allow for the "combining" of uses (i.e., some digital content may be collected virtually via a smartphone or tablet app and other digital content may be collected through the use of the physical USB, but all the digital content can be downloaded to a computer and managed by the information management software).

As discussed in summary fashion above, the information management software can be integrated with smartphone, tablet or other portable computing device apps. For example, the information management software preferably will support the exchange of metadata between smartphone or tablet devices in a bi-directional fashion. This exchange would be accomplished through a variety of methods including physical exchange via a wireless or cable-connected network, a memory device as a transport mechanism, email exchange of said metadata, and/or over a cloud connection. The system would support the transfer from the smartphone/tablet app and/or the cloud to the information management software running on a computer or vice versa. Some features that will be supported include the exchange of ratings of the event or session, if the event or session was "visited" or "attended", or notes made on the event or session. There is no limit to the number or types of possible notations that can be, for example, made on one device and then synced with other devices, and said notations and can be customized on a case by case basis. Preferably a login or registration will link multiple computing devices to sync digital content and content added by users. Such a registration could also be configured to sync customization of the apps or software. For example, an entity that has established enterprise-wide UDCs may have such UDCs synced between the information management software on its computers and/or network and the corresponding apps on processor-enabled portable devices such as smartphones and tablets.

For example, in this embodiment as an attendee walks a trade show floor and visits exhibitors, the attendee would use their smartphone app to set a rating of one to five stars for selected exhibitors, indicate when they have "visited" a booth or not (this would not eliminate the need to collect the "content" with the Viridistor USB), and may make notes about certain booths/exhibitors. When a connection is available, this information would be uploaded to the cloud, which would in turn download it to information management software on a computer or network. In another embodiment the information would be downloaded to the portable device of a Manager, or to the portable devices of other authorized users, who would also sync with one another.

In another example, the user of the information management software may rate in advance or set categories in the information management software on the PC or Mac, and those ratings, etc. would be synced to the app running on the smartphone(s) or tablet(s).

In additional embodiments, the information management software is configured to track and report to the administrator/software supplier the actual use or access of digital content by a user, even in embodiments in which users have obtained anonymous portable devices such as USB drives to obtain digital content. This reporting could log all levels of user activity, from opening individual content within the Browse Visited Exhibitor tab, to opening content from the Green Box column, or Exhibitor links from the Browse Exhibitors by Category tab. This same capability would be available on all tabs of the information management software.

In one such embodiment, upon the first use (or some subsequent early use) of the information management software and/or changing of the initials of the user of the information management software, the user would be required to input their contact information (name, company, phone number, email, etc.), and consent to tracking of their use of the information management software. The information management software would then log all or much of the use of and access to the content on the information management software USB itself, or its use on the user's computer and/or network. At shut down or start up or another relevant trigger event, the information management software application would check for Internet connection and then upload this log data to an administrator server that is administered by the data administrator. Tracking such use would provide valuable information for exhibitors and/or third parties that would be interested to know what information a user may be interested in. Thus, it could generate sales leads. Tracking use may also provide valuable information for studying user patterns in order to improve or further develop products.

At predetermined time intervals and upon request, the data administrator would generate reports of use and provide such reports to the exhibitors who have subscribed to this reporting option. Any level of granularity of what information was accessed by which particular user could be provided. Reporting could include the date, time, item opened, the user's rating of the exhibitor, etc., by whom etc. Preferably exhibitors would only get information about user's accessing that exhibitor's information. In some embodiments an exhibitor can subscribe to user access information about all user access to information in particular categories, user access to other exhibitor's information, or other criteria such as the exhibitor's own ratings of other exhibitors' booths, etc. In some embodiments the logging and reporting feature could be an option that could be turned on or off by the user. In other embodiments user consent to the reporting feature can be made a condition of use at the event.

Variations on this concept are also contemplated. For example, in some embodiments only non-personally-identifying data is communicated to the exhibitors. In still further embodiments information regarding use of the content may additionally or alternatively be uploaded to an administrator version of the information management software within the enterprise's network.

It is also to be understood that the activity logging feature is contemplated for use in online-based or portable app versions of the information tracking software, as well as network-based versions.

In some embodiments, when or after collecting demographic information, the information management software reports to the data administrator server system the visits or collections of which booth or session was visited. This satisfies the support of a next-generation lead retrieval solution with many enhancements to ensure the metrics have value to the participants (exhibitors, event producers, third parties, etc.). In this option, the first time (or another specified time or triggering event) that the user of the information management software starts the information management software application, they will be required or prompted to fill in their "lead tracking" or demographic information. This information, designated by the event producers or management, may include name, company/organization, email address, phone number, physical address etc. This is not limited to any set of demographic information.

If the user of the information management software first uses the software in the offline mode (no Internet present), the application will store or cache the registration information, and wait for an opportunity to send the information to the data administrator server systems. An option to disable the use of the system (optionally delete information) after a predestinated number of uses without the registration being sent to the servers is an option in some embodiments.

In this embodiment the system is designed to ensure that the logging or reporting of information will be updated to ensure that the registration gathers the visited content. For example, one embodiment could have the information management software application(s) delivered prior to an event and the participant fulfills the registration prior to collecting data. The application will be programmed such that it makes contact with the data administrator servers after content is added, and as a failsafe, at a predetermined time after the event to ensure the most accurate representation of whom the participant visited is captured. Other situations that would trigger such an update of the collected information on the data administrator server would be any use of the "Manager" mode when the collection is added to via that feature or at any time replications are made and new registrations occur. The data administrator servers will maintain date/time, content, and change logs to ensure that the profile for each participant and what that participant visited or attended is as accurate as possible and can be then provided to the event producers, exhibitors, etc.

In additional embodiments the registration information collected may be cross-referenced with the collected registration information managed by the event producer. If the registration information did not match, for example, an attendee's email address, the data administrator system and or information management software may take actions such as limited access, require additional information, etc. to validate and add value to the use of the system. Through this same methodology, access to the information provided on the information management software applications or information collected at the event could be controlled, limited, etc. Last, having knowledge metrics of who was or was not at the event would be provided to the event producer and or exhibitors for access control, lead tracking or other business reasons and actions.

In further embodiments, when Internet access is available, the information management software will send to the data administrator servers a list of each booth, session, etc. that the USB of the participant (if that mode of collection was used) visited (i.e., inserted into a content delivery device or other embodiment). This function need only to take place one time (optionally).

Further embodiments would enable more than one type of registration. For example, the event may require that the registration be completed to use the information management software and content from the event, but offer the option of participation in the ongoing demographic use collection. The condition of use may offer the extra value of participation to then support the option of "dynamic information" updating as noted herein. Further, a user who consents to participate may receive an incentive such as a discount, or continued operation of the information management software without having to pay for a license. In this manner, the goal of "lead retrieval" is addressed in many forms, without the need of preregistration of the participants' information, the support of optional levels of "lead tracking" and subsequent reporting to the data administrator system, which then would either supply said demographic information to the event producer and or the exhibitors, etc. directly, and eliminate the need for conventional lead retrieval systems that must then be downloaded and information sent to the respective user (exhibitor at a booth for example).

Within the data administrator system, the content delivery devices preferably track the number of visits (insertions of USB devices, for example, into the unit). This information preferably is downloaded at a later date and each participant (exhibitor from that booth), receives the notification of how many "impressions" were made at the event, etc. Thus, exhibitors are given immediate feedback on the distribution of their materials. In some embodiments the content delivery device does not collect any demographic information for the visitor (in other embodiments, the collection of this type of demographic at the device level (content delivery device) or other collection system may be supported). This feature, coupled with the documented "lead tracking" as provided by the information management software application as noted herein, provides business information to the participant (exhibitor with the booth) to know who came by their booth and then later, at a minimum, the basic registration from which the visitors' contact and business information is delivered to the event producer and or exhibitor etc. once the user completes the registration process.

In some embodiments the lead tracking features will be supported in all facets of the information management software and data administrator system, in addition to the use of "replication" or sharing of content, where upon a replication, the information management software would "reset" the demographic collection fields of the application and require the "new user" to complete said registration. This would offer the ability to track and deliver information to the event producer and or exhibitors, for example, of an "extended audience" of individuals who may not have even attended the event, but were now able to access and be exposed to the content/information of said event, potentially offering even more prospective "buyers" or attendees of an event which adds value to not only the event producer, but to the exhibitors themselves. The option exists for the data administrator system to "cross match" and determine if new registrants a) did actually attend the event, determined by cross-matching with the registration information gathered by the event producers or b) resulted from the sharing of information beyond that of physically attending the event. Upon the delivery of said demographics and metrics, the event producer may elect to charge for the expanded exposure as provided through the use of the data administrator systems and the information management software systems. It is conceivable that this charge could also be applied to the user of the information via the information management software as an option before the information management software would fully function. An example of this use would be a conference where participation and use of "materials and handout content" that is managed by the information management software is on a paid basis. In sharing, the option of basic protection and requirement of payment before access could be provided for, including encryption of content itself as contained and managed by the information management software application.

All of these embodiments may be expanded upon with all uses of the many uses and structural iterations of the information management software systems and the data administrator system in total.

In still another embodiment, online communication between information management software and the data administrator server is used to allow for updates to information already gathered and saved on the particular instance of the information management software. For instance, at startup or upon a manually triggered event, the information management software would contact the data administrator servers in connection with the particular event. If the user of the information management software has properly registered with the data administrator server, the information management software would check for new or updated content for the exhibitors, or sessions, they attended. If the updated content is available, as the exhibitor would have had to agree to the terms of participation with this option & provided content to be posted on the data administrator server, the information management software would then receive the update and install it onto the instance of the information management software. This update would include updated information in addition to additional information that the exhibitor wishes to provide, along with a new (if desired) landing page for that exhibitor.

Optionally, exhibitors that were missed during the event could offer their full content and the user of the information management software would, for example, check a check box to see which exhibitors that were missed are now offering said content. A dialog box would notify the user of the information management software of this content. The user of the information management software would then select which content they want to receive. This option preferably would be recommended for use only while the information management software is running on a computer, as it would potentially exceed the capacity of the original USB device. Of course, however, future USB or other portable devices may be capable of accommodating such memory requirements.

Preferably, the user would have the option of reviewing the list of content that is an update to existing content or new content that is available for exhibitors that were not visited (i.e. the USB used for collection was never inserted into that particular exhibitor's content delivery device). This information could be listed by name of exhibitor, category of exhibitor, etc.

The information management software can be used for a single event, such as a single trade show, or can be used to catalog/maintain data from several such events, or even several different types of events, or different types of digital content delivery. For example, an information management software package may monitor and archive in an organized and easily-accessible manner all of an organization's trade show attendance over a period of many years. Such trade shows can be sorted by name, subject matter, product line, etc. Still further, and at the same time, the same information management software can keep track of materials received at conventions, and the like. And, as discussed above, the information management software can be used to update digital content that was received at previous trade shows. Yet further, the information management software can keep track of materials at internal training sessions. Along the lines of this example, the information management software can be used to keep track of disparate, seemingly unrelated information.

Figure 17:
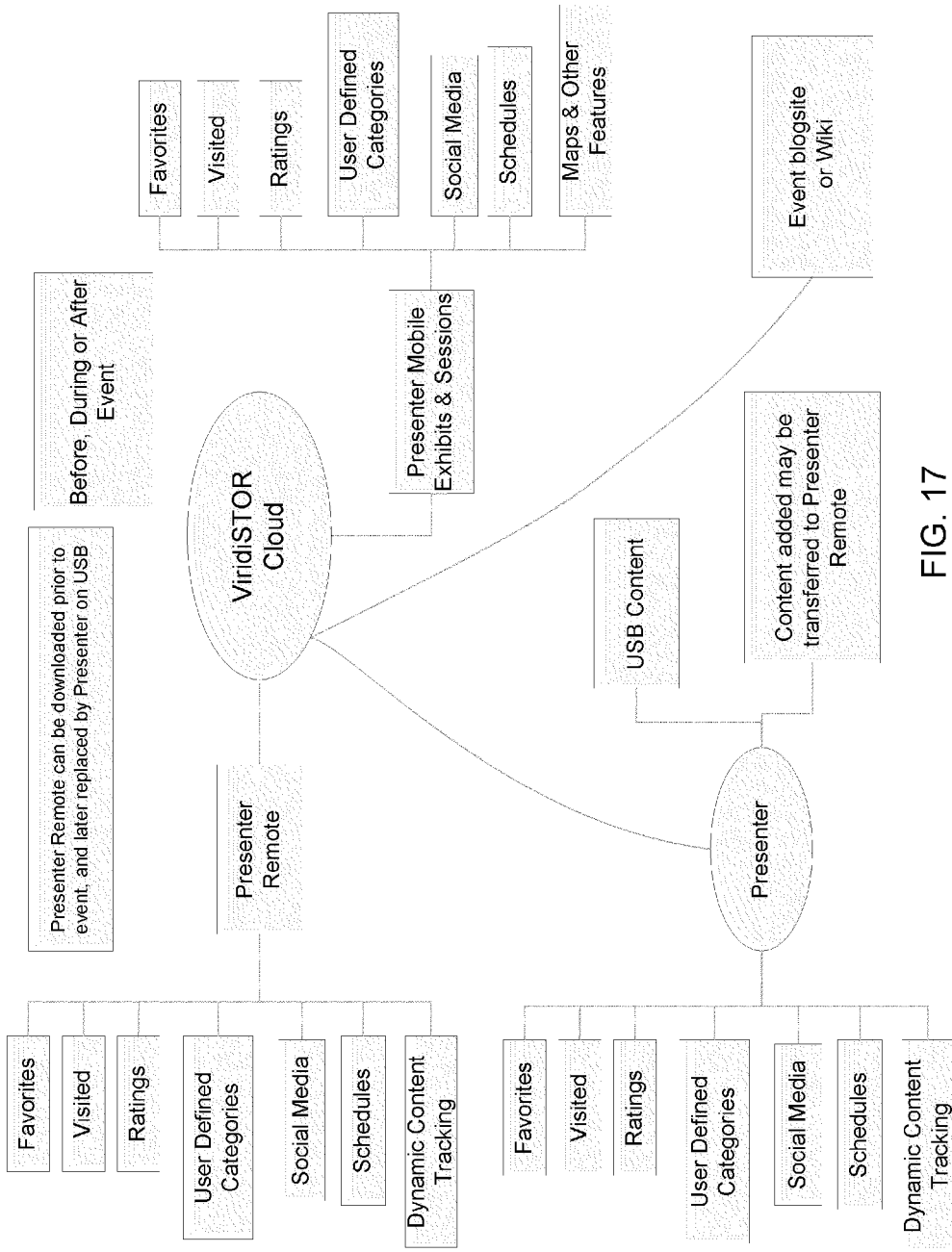
FIG. 17 is a schematic view showing a relationship between information management software versions and an administrator cloud in accordance with one embodiment.

With reference next to FIG. 17, a schematic relationship in accordance with one embodiment is shown. As shown, the administrator (here Viridistor) can maintain an online presence on the cloud. Prior to a trade show or other event a user may download a "remote" version of the information management software onto his local computer and/or network. With this remote version the user can plan in advance and interact with certain preloaded content, such as identifying potential favorites, identifying booths to plan to visit, pre-rating exhibitors, creating UDCs, activating social media of selected exhibitors, and developing a visit schedule. Also, such activity may be tracked and logged and passed along to the administrator cloud, and can be included in a lead tracking database.

With continued reference to FIG. 17, at the event the user may obtain a USB Drive with the information management software preloaded thereon. Upon completion of the event, the digital content from the event can be Replicated to the information management software already on the user's computer, and the existing digital content and software will be updated/replaced with the newly-received content. The user can, of course, modify ratings, favorites and the like, and access and review digital content obtained at the event. Activity logging and tracking preferably is communicated to the administrator cloud.

FIG. 17 also shows that a user may use a mobile app with a processor-based portable device at the event. As discussed above, the user can modify ratings, UDCs, favorites and the like using the mobile app, and can have access to a schedule or map to help the user visit booths as planned. Further, the user can track his progress through the event. The portable device can further correspond with the administrator cloud, which will in turn communicate and synchronize with the user's information management software, or with other users' portable devices. Further in the illustrated embodiment, users may access, via the administrator cloud, an event blogsite or wiki that will enable the users to read and/or write comments concerning the event.

Although the inventions herein have been disclosed in the context of certain preferred embodiments and examples, it will be understood by those skilled in the art that the present inventions extend beyond the specifically disclosed embodiments to other alternative embodiments and/or uses and obvious modifications and equivalents thereof. In addition, while a number of variations have been shown and described in detail, other modifications, which are within the scope of this invention, will be readily apparent to those of skill in the art based upon this disclosure. It is also contemplated that various combinations or sub combinations of the specific features and aspects of the embodiments may be made and still fall within the scope of invention. For example, the features discussed herein have been discussed in the context of a trade show, but they can be applied in many contexts, such as events large and small, with or without content delivery devices, and even with or without portable memory devices. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above.

What is claimed is:

1. A method for tracking and documenting consumer interest using a portable memory device, comprising:
   providing to a plurality of users digital content concerning a plurality of vendors at an event on a portable memory device, a first portion of the digital content being related to a first product of a first vendor, a second portion of the digital content being related to a second product of a second vendor, the first vendor having a booth at the event at which any of the plurality of users can optionally obtain a supplemental first portion of digital content, the second vendor having a booth at the event at which any of the plurality of users can optionally obtain a supplemental second portion of digital content, the digital content being disseminated at the event and configured to be saved on a user computer;
   providing to each of the plurality of users information management software in combination with the first portion and second portion of the digital content, the information management software defining a plurality of subject matter categories and subject matter subcategories, the information management software associating the first portion and the second portion with a first one of the plurality of subject matter subcategories, the information management software configured to enable the respective user to access and review, after or remote from the event, the digital content on the user computer, the information management software configured to be saved on the user computer;
   wherein the information management software receiving a user rating input indicating a rating assigned by the user to the first vendor's booth, and saving the user rating input so that the user rating input is associated with the first vendor's booth along with receiving a user visit input indicating that the user has visited the first vendor's booth, and saving the user visit input information;
   the information management software creating a log of user access to the digital content and saving the log on the user computer, the log of a first one of the plurality of users documenting access to the first portion of the digital content;
   the information management software communicating the log to a remote computer; and
   communicating information about the log to the first vendor.

2. The method of claim 1 additionally comprising classifying user access by the associated subject matter category and/or subcategory, and identifying user interest based upon logged user access in the subject matter category and/or subcategory.

3. The method of claim 2 additionally comprising identifying a third vendor having a third product in a subject matter category in which the user has expressed interest, and providing contact information for the user to the third vendor.

4. The method of claim 3, wherein the user obtains the digital content anonymously, and additionally comprising conditioning continued use of the information management software upon the user providing contact information and permission to log use of the information management software.

5. A method for delivering and managing digital content, comprising:
   a first one of a plurality of attendees at a trade show event receiving a portable memory device having an information management software stored therein, the portable memory device also having a first group of data stored thereon, the first group of data comprising an identity of a plurality of exhibitors participating in the trade show event, each exhibitor having a first portion of digital content stored on the portable memory device, the information management software defining a plurality of subject matter categories and subject matter subcategories, the information management software associating each of the first portions of digital content with one of the plurality of subject matter subcategories;
   the first attendee engaging the portable memory device with a plurality of content delivery devices, each of the content delivery devices associated with one of the plurality of exhibitors;
   the portable memory device keeping an engagement log tracking engagement with each of the content delivery devices with which it is engaged, each engaged content delivery device delivering a second portion of digital content about the associated exhibitor to the portable memory device during engagement, the second portion of digital content from each of the engaged content delivery devices being part of a second group of data, the information management software associating each second portion of digital content with one of the plurality of subject matter subcategories;
   the information management software receiving a user rating input indicating a rating assigned by the user to a first one of the plurality of exhibitors, and saving the user rating input so that the user rating input is associated with the first one of the plurality of exhibitors along with receiving a user visit input indicating that the user has engaged the content delivery device of the first one of the plurality of exhibitors, and saving the user visit input information;
   the first attendee engaging a computing device with the portable memory device to transfer the information management software, engagement log and first and second group of data from the portable memory device to the computing device;
   the first attendee searching the digital content by subject matter category and subject matter subcategory using the computing device, wherein such searching will include the first group of data and the second group of data;
   the computing device creating an access log tracking access of the digital content by the first attendee and saving the access log on the computing device; and communicating the engagement log and the access log to a remote computer system.

6. The method of claim 5 additionally comprising the computing device documenting an input log of a user's inputs to the information management software.

7. The method of claim 5, wherein the information management software receives inputs from the first attendee associated with the second portion of digital content associated with a first one of the plurality of exhibitors and saves the inputs on the computing device.

8. A method, comprising:
receiving digital content from each of a plurality of exhibitors that have arranged to exhibit exhibitor content at an event, the digital content for each of the exhibitors having a first portion and a second portion;
associating each of the first portions and second portions with one of a plurality of subject matter categories and one of a plurality of subject matter subcategories;
a plurality of attendees at the event having a portable memory device, the portable memory device having the first portion of the digital content from each of the exhibitors and an information management software stored thereon, the information management software configured to recognize and save each second portion of digital content if and when it is received from the associated exhibitor, the information management software receiving a user rating input indicating a rating assigned by the user to the exhibitor, and saving the user rating input so that the user rating input is associated with the exhibitor, wherein the information management software is configured to be transferred to a computing device along with each of the first and second portions of digital content, and wherein the information management software manages the digital content;
receiving from the computing device a log documenting use of the information management software by a first attendee having a first one of the portable memory devices to access digital content from a first one of the exhibitors; and
informing the first one of the exhibitors about the first attendee's access of digital content.

9. The method of claim 8, wherein the information management software on the computing device automatically accesses a content administrator server online and updates the digital content.

10. The method of claim 8 additionally comprising receiving from the computing device an engagement log documenting that the first one of the portable memory devices obtained a second portion of the digital content from a second one of the exhibitors during the event.

11. The method of claim 10 additionally comprising receiving from the computing device an access log documenting that the first attendee accessed the second portion of the digital content using the information management software on the computing device.

12. The method of claim 11 additionally comprising receiving from the computing device an input log documenting inputs by the first attendee to the information management software.

13. The method of claim 12, wherein inputs of the attendee comprise ratings that the attendee applied to respective portions of the digital content.

14. The method of claim 12, wherein inputs of the attendee comprise an indication whether the attendee visited an exhibition or presentation of a respective one of the exhibitors.

15. The method of claim 12, wherein inputs of the attendee comprise demographic information about the attendee.

* * * * *